US007225135B2

(12) United States Patent
Thomas

(10) Patent No.: US 7,225,135 B2
(45) Date of Patent: May 29, 2007

(54) SIGNAL-PREDICTIVE AUDIO TRANSMISSION SYSTEM

(75) Inventor: David B. Thomas, Albuquerque, NM (US)

(73) Assignee: Lectrosonics, Inc., Rio Rancho, NM (US)

( * ) Notice: Subject to any disclaimer, the term of this patent is extended or adjusted under 35 U.S.C. 154(b) by 806 days.

(21) Appl. No.: 10/118,115

(22) Filed: Apr. 5, 2002

(65) Prior Publication Data

US 2003/0191634 A1 Oct. 9, 2003

(51) Int. Cl.
*G10L 19/00* (2006.01)
*G10L 21/00* (2006.01)
*H04B 1/00* (2006.01)

(52) U.S. Cl. ...................... 704/500; 704/500; 704/503; 455/43

(58) Field of Classification Search ................ 704/500, 704/503; 455/43
See application file for complete search history.

(56) References Cited

U.S. PATENT DOCUMENTS

| | | | | |
|---|---|---|---|---|
| 3,763,433 | A | 10/1973 | Nicholas | 325/38 B |
| 3,973,199 | A * | 8/1976 | Widmer | 375/243 |
| 4,099,122 | A * | 7/1978 | van Buul | 375/249 |
| 5,005,082 | A | 4/1991 | Zdepski et al. | 358/174 |
| 5,185,806 | A * | 2/1993 | Dolby et al. | 381/106 |
| 5,189,701 | A | 2/1993 | Jain | 381/41 |
| 5,550,859 | A * | 8/1996 | Seshadri | 375/216 |
| 5,610,943 | A | 3/1997 | Kakuishi et al. | 375/243 |
| 5,692,057 | A | 11/1997 | Grad et al. | 381/77 |
| 5,777,569 | A | 7/1998 | Naruki et al. | 341/155 |
| 5,780,784 | A * | 7/1998 | Robbins | 181/102 |
| 5,794,125 | A | 8/1998 | Grad | 455/38.3 |
| 6,138,036 | A * | 10/2000 | O'Cinneide | 455/557 |
| 6,300,880 | B1 * | 10/2001 | Sitnik | 340/825.25 |
| 6,487,535 | B1 * | 11/2002 | Smyth et al. | 704/500 |
| 6,492,929 | B1 * | 12/2002 | Coffey et al. | 341/155 |
| 6,597,301 | B2 | 7/2003 | Cerra | 341/155 |
| 6,647,064 | B1 * | 11/2003 | Eguchi | 375/245 |
| 6,664,913 | B1 * | 12/2003 | Craven et al. | 341/200 |

OTHER PUBLICATIONS

Pan, Digital Audio Compression, Spring 1993, Digital Technical Journal, vol. 5, No. 2, pp. 1-14.*

Kabal, "SpcovMXpc," http.//www.tsp.ece.mcgill.ca, dated Jun. 12, 1999.

(Continued)

*Primary Examiner*—Talivaldis Ivars Smits
*Assistant Examiner*—Myriam Plerre
(74) *Attorney, Agent, or Firm*—Edwin A. Suominen; Louis J. Hoffman

(57) ABSTRACT

Various methods and systems disclosed compand audio signals using signal prediction, followed by expansion and reconstruction. The methods and systems compress and expand an error signal that represents deviations between samples of the original signal and predicted samples. Each predicted sample is generated by an extrapolation based on a sub-sequence of prior samples of the original signal. A time series of correction samples based on the error signal as it is received from the analog channel after amplitude expansion. Output samples are then generated from the sums of the correction samples and respective predicted samples of a second time series, each of which is extrapolated based on a sub-sequence of prior correction samples. Numerous variations are also disclosed.

20 Claims, 24 Drawing Sheets

OTHER PUBLICATIONS

Lectrosonics, Inc., "Wireless Microphone Systems: Concepts of Operation and Design," dated Mar. 2002.

Web page printout. "Lecture 18, Fir Adaptive Filters: LMS Algorithm," date Spring 2000.

P. Prandoni, and M. Vetterli, "An FIR Cascade Structure for Adaptive Linear Prediction," *IEEE Transactions on Signal Processing*, Sep. 1998, vol. 46, No. 9, pp. 2566-2571.

D. Deng, "Applications of Linear Prediction," http://www.ee.latrobe.edu.au/-dennis/teaching/ELE41ASP/lect18-19.ppt., 1998, 1999.

Hayes, H. Monson, "Statistical Digital Signal Processing and Modeling," 1996, pp. 128-203.

Pan, Y. Davis, "Digital Audio Compression," *Digital Technical Journal*, vol. No. 2, Spring 1993.

Clarkson, M. Peter, *Optimal and Adaptive Signal Processing*, 1993, Sections 3.3, 4.1, 5.4.

A. Matsunaga, "An Analog Speech Scrambling System Using the FFT Technique with High-Level Security," *IEEE Journal on Selected Areas in Communication*, vol. 7, No. 4, May 1989, pp. 540-557.

Tajima, J., Kobayashi, K., "Digital Signal Processing Syllabic Compander," *Electronics and Communications in Japan*, Part 1, vol. 68, No. 4, 1985, pp. 113-122.

"Linear Prediction and Linear Predictive Coding," *Numerical Recipes in Fortran 77: The Art of Scientific Computing*, 1992, pp. 557-565.

K. Hooli, "Adaptive Filters: Least-mean-square algorithm," undated.

N. Jayant, P. Noll, "Digital Coding of Waveforms: Principles and Applications to Speech and Video," 1984, pp. 58-65, 252-293.

"Adaptive Differential Pulse Code Modulation 12," undated, pp. 383-432.

J. Han, et al., "Nonlinear Effects of the LMS Predictor for Chirped Input Signals," undated.

"Generalized System Equations for a Linear Predictor," pp. 91-97.

"Vega U2020 UHF Wireless Microphone System," undated.

Showorks, Inc., "Vega U2020 UHF Wireless Microphone System," 1998.

Lectrosonics, Inc., "UDR200C, Synthesized UHF Diversity Receiver: Technical Data," possible date mark Jun. 2001.

L. Lu, "A Digital Realization of Audio Dynamic Range Control," *in Proc. of ICSP '98*, Oct. 1998, vol. 2, pp. 1424-1427.

* cited by examiner dB

3900

SIGNAL-PREDICTIVE AUDIO TRANSMISSION SYSTEM

COPYRIGHT NOTICE

A portion of the disclosure of this patent application, including the accompanying compact discs, contains material that is subject to copyright protection. The copyright owner has no objection to the facsimile reproduction by anyone of this patent document or the patent disclosure as it appears in the Patent and Trademark Office patent file or records, but otherwise reserves all copyright rights.

BACKGROUND OF THE INVENTION

Although audio signals are often transmitted in digital form, analog transmission remains attractive for many applications, particularly where bandwidth and dynamic range constraints of the transmission channel limit the potential data rate of digital transmission. Audio encoding schemes have been developed that permit audio transmission at lower data rates, but the data rate reduction is typically accompanied by various drawbacks. These include digital signal processing complexity, degraded audio quality, encoding and decoding delays, and abrupt performance degradation with weakening signals.

Conventional analog transmission techniques can efficiently convey the frequency spectrum of an audio signal without the excess bandwidth of high digital data rates or the disadvantages associated with data rate reduction. Such techniques require strong signals to preserve high audio dynamic range, however, which is ultimately limited by noise in the analog transmission circuitry. This problem is often mitigated by "companding" the signal.

Companding involves compressing an audio signal by variably amplifying it depending on signal level (with stronger signals being amplified less than weaker signals), transmitting it over an analog channel, then expanding the audio signal at the receiving end of the channel by subjecting it to a complementary variable amplification. The two variable amplifications complement each other so that expansion restores the final signal to its original amplitude. The compressed audio signal requires less dynamic range than the original for faithful transmission over the analog channel. However, companding requires compromises in selecting the attack and release times used in tracking amplitude variations. The compressor should track variations rapidly enough to compress a signal effectively but slowly enough to avoid distorting its low-frequency components. The resulting design compromise attempts to balance compandor performance with compandor artifacts like signal distortion and "pumping" and "breathing" sounds that many listeners find equally objectionable.

Dual-band compandors have been developed in an attempt to alleviate these audio problems. By separating an audio signal into high and low frequency bands, a dual-band compandor can process each band with attack and release times better suited for the frequencies in question. But the selections made for each band are still compromises, and compandor artifacts and signal distortion can remain problematic. In addition, the expansion stage of a multi-band compandor is difficult to implement accurately.

Accordingly, a need remains for a method of transmitting audio signals over an analog channel with the dynamic range benefits of companding but without significant audio degradation of the type conventionally associated with companding, and without the difficulty of multiple band companding.

SUMMARY OF THE INVENTION

Methods and systems according to various aspects of the present invention compand audio signals using signal prediction, followed by expansion and reconstruction. The methods and systems compress and expand an error signal that represents deviations between samples of the original signal and predicted samples. Each predicted sample is generated by an extrapolation based on a sub-sequence of prior samples of the original signal.

Various methods and systems of the invention further generate a time series of correction samples based on the error signal as it is received from the analog channel after amplitude expansion. Output samples are then generated from the sums of the correction samples and respective predicted samples of a second time series, each of which is extrapolated based on a sub-sequence of prior correction samples.

To generate the amplitude-compressed error signal, various methods and systems of the invention generate a time series of input samples representing amplitude of the continuous-time signal at regularly spaced sample times. They further generate predicted samples that are each based on extrapolation of a sub-sequence of prior input samples. They then compute a sub-sequence of raw differentials between respective time series of input samples and predicted samples and amplitude-compress the differentials to reduce differences in overall amplitude between sub-sequences of large differentials and sub-sequences of small differentials. The result is a time series of amplitude compressed error samples, which is the source of the continuous-time error signal.

A particularly advantageous system and method of the invention uses adaptive linear predictors to perform extrapolation during compression and reconstruction. Each predictor maintains coefficients of a prediction error filter and a buffer of samples that are based on errors the predictor has made in previous extrapolations. The predictor effectively applies an FIR filter to a sequence (i.e., time series) of differences between (1) its predictions of previous input samples and (2) the input samples themselves. By filtering out errors caused by unpredicted signal variations, the predictors generate extrapolations that are based more on the cyclic, largely accurate components of their previous predictions than on unavoidable errors induced by such variations. (These variations are sometimes called "innovations" because they are unexpected deviations from the signal norm.) Each predictor gradually updates its coefficients in a manner designed to minimize error in its predictions. As a result, the prediction error filter minimizes attenuation of the accurate components of the previous predictions and thus preserves their positive effect in subsequent extrapolations.

In contrast, the prediction error filter of each predictor attenuates noise on the predictor input, which the filter treats as unpredictable signal variations or "innovations." Thus, the predictor significantly reduces the noise level in spectral regions removed from the spectra of predicted signal components. It is in these otherwise quiet spectral regions where noise is most noticeable to the ear, and the use of adaptive predictors in this advantageous method of the invention provides a significant psychoacoustic enhancement to the quality of the reconstructed signal.

A more particular system and method of the invention generates each updated set of predictor coefficients by reducing their amplitudes with a small forgetting factor and adding suitable offsets, e.g., computed in accordance with the least-mean-squares (LMS) algorithm, to compensate for the previous prediction being overly low or high. The LMS algorithm can include a quantization step, in which case the offset added to each coefficient has a constant, small magnitude and suitably chosen positive or negative sign. A predictor adapted in such a fashion seems to extrapolate signals somewhat better at low frequencies than at high frequencies. The resulting prediction error signal has low-frequency components that are significantly attenuated relative to those of the original signal on which the extrapolation is based. Thus, by employing such prediction and compressing and expanding the error signal rather than the original signal, the invention can take advantage of companding to enhance the signal's dynamic range while substantially protecting the signal's low-frequency components from compandor distortion. As a result, the companding can operate with faster attack and decay times and avoid introducing "pumping" and "breathing" audio artifacts.

Another advantageous system and method of the invention amplitude-compresses a sub-sequence of raw differentials (actual vs. predicted sample amplitude) by computing a sidechain factor responsive to a time-averaged overall amplitude of the sub-sequence. The system and method then adjusts amplitude of the raw differentials in opposite proportion to the sidechain factor, boosting the amplitudes of smaller differentials or reducing the amplitudes of larger differentials. The system and method can perform a complementary amplitude expansion on the correction (received) samples by computing the sidechain factor responsive to a time-averaged overall amplitude of a sub-sequence of receive samples. The system and method then adjusts amplitude of the receive samples by reducing the amplitudes of smaller-valued samples or boosting the amplitudes of larger-valued samples, thus increasing the amplitude range.

The above summary does not include an exhaustive list of all aspects of the present invention. For example, various aspects of the invention call for circuitry that advantageously implements the methods discussed above. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Various embodiments of the present invention are described below with reference to the drawings, wherein like designations denote like elements.

DESCRIPTION OF PREFERRED EXEMPLARY EMBODIMENTS

Figure 1:
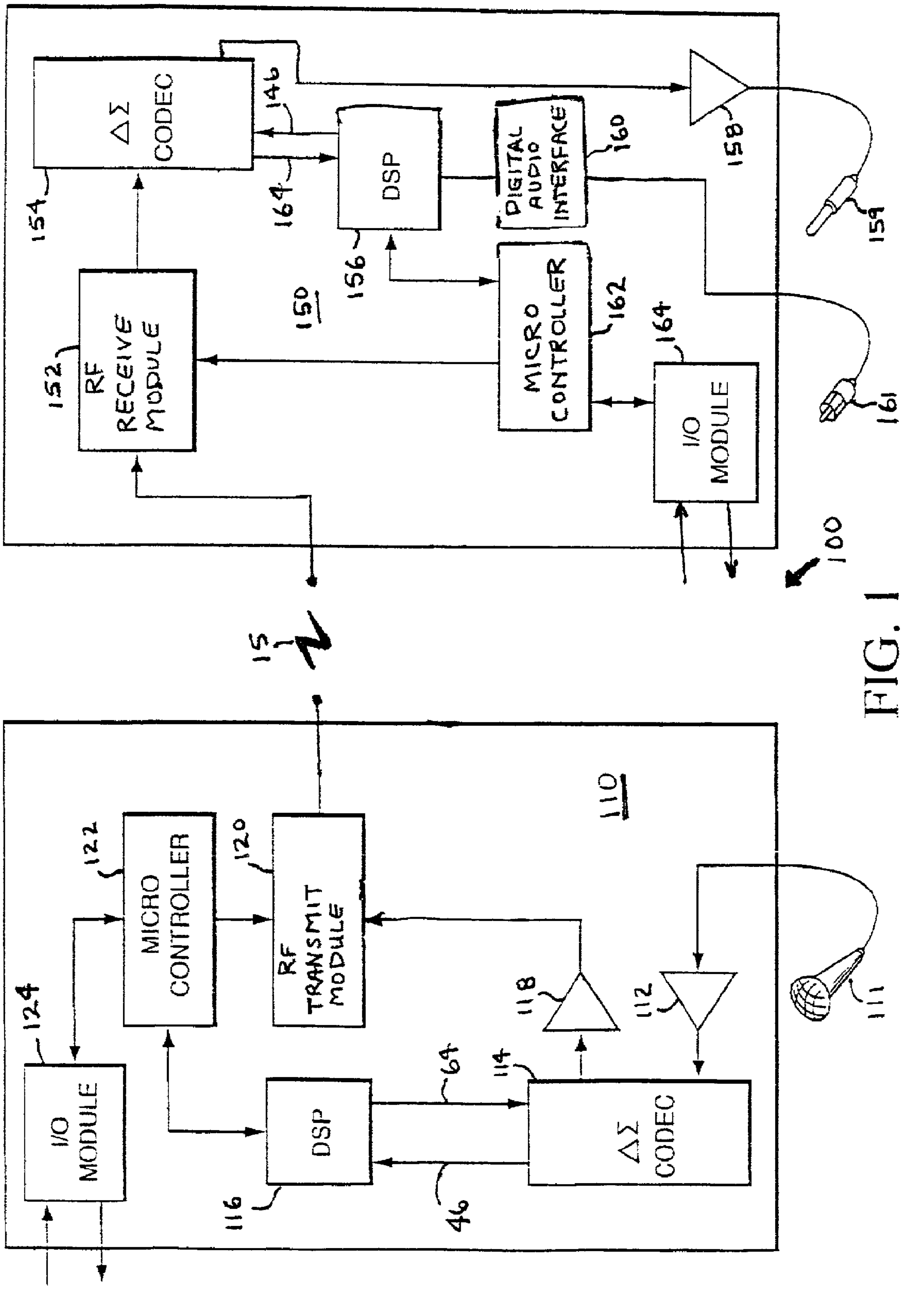
FIG. 1 is a schematic block diagram of a wireless microphone transmitter and receiver employing signal-predictive audio transmission according to various aspects of the invention.

A signal-predictive audio transmission system according to various aspects of the present invention provides numerous benefits, including substantial psychoacoustic reduction in perceived noise levels and enhancement of dynamic range, without significant audio degradation of the type conventionally associated with companding. Such a system can be advantageously implemented wherever such benefits are desired. For example, wireless microphone system 100 of FIG. 1 includes a transmitter 110 that receives an audio input signal at a microphone 111 and sends a compressed error signal to a receiver 150, in accordance with various aspects of the invention.

The error signal that transmitter 110 sends to receiver 150, which travels via field radiation over wireless link 15, is not directly based on the actual audio input signal. (Indeed, it is barely recognizable if listened to directly, in many implementations.) Rather, the error signal is representative of amplitude-compressed deviations between the input signal and an extrapolation that transmitter 110 computes based on the input signal.

Wireless microphone system 100 and other exemplary embodiments of the invention may be better understood with reference to FIGS. 1–36, the detailed description below, the 296-line program listing immediately following the detailed description, and the program modules on two compact discs labeled COPY 1 and COPY 2 that accompany this application. The program listing and the program modules are incorporated herein by reference and form an integral part of this specification. Both compact discs include the ASCII program module files listed below in TABLE I and TABLE II using the reference identifiers "A" through "Z."

The program listing, which implements a simulation of the invention with the GNU OCTAVE mathematical programming language, is referenced herein with the name "program listing" followed by a line number or numbers, e.g., "program listing 090–110."

The modules listed in TABLE I below implement a simulation of the invention with the C++ programming language.

TABLE I

| Reference Id. | Name | File Date-Stamp | Size in Bytes |
|---|---|---|---|
| A | Makefile-cpp.txt | Feb. 4, 2002 | 727 |
| B | main.cpp | Feb. 4, 2002 | 2,059 |
| C | adapt.cpp | Feb. 4, 2002 | 3,278 |
| D | adapt.hpp | Feb. 4, 2002 | 624 |
| E | Compandor.cpp | Feb. 4, 2002 | 823 |
| F | Compandor.hpp | Feb. 4, 2002 | 440 |
| G | delay.cpp | Feb. 4, 2002 | 655 |
| H | delay.hpp | Feb. 4, 2002 | 281 |
| I | lib.cpp | Feb. 4, 2002 | 803 |
| J | lib.hpp | Feb. 4, 2002 | 279 |
| K | logamp.cpp | Feb. 4, 2002 | 778 |
| L | logamp.hpp | Feb. 4, 2002 | 337 |
| M | Wavfile.cpp | Feb. 4, 2002 | 1,263 |
| N | Wavfile.hpp | Feb. 4, 2002 | 979 |

The modules listed in TABLE II implement an embodiment of the invention with the TMS320V5402 DSP programming language.

TABLE II

| Reference Id. | Name | File Date-Stamp | Size in Bytes |
|---|---|---|---|
| O | makefile-dsp.txt | Feb. 4, 2002 | 1,284 |
| P | main.asm | Feb. 4, 2002 | 2,447 |
| Q | main.inc | Feb. 4, 2002 | 268 |
| R | adapt.asm | Feb. 4, 2002 | 5,358 |
| S | adapt.inc | Feb. 4, 2002 | 41 |
| T | boot.asm | Feb. 4, 2002 | 1,772 |
| U | boot.inc | Feb. 4, 2002 | 19 |
| V | mcbsp.asm | Feb. 4, 2002 | 1,220 |
| W | mcbsp.inc | Feb. 4, 2002 | 563 |
| X | util.asm | Feb. 4, 2002 | 5,443 |
| Y | util.inc | Feb. 4, 2002 | 253 |
| Z | vecs.asm | Feb. 4, 2002 | 667 |

Figure 3:
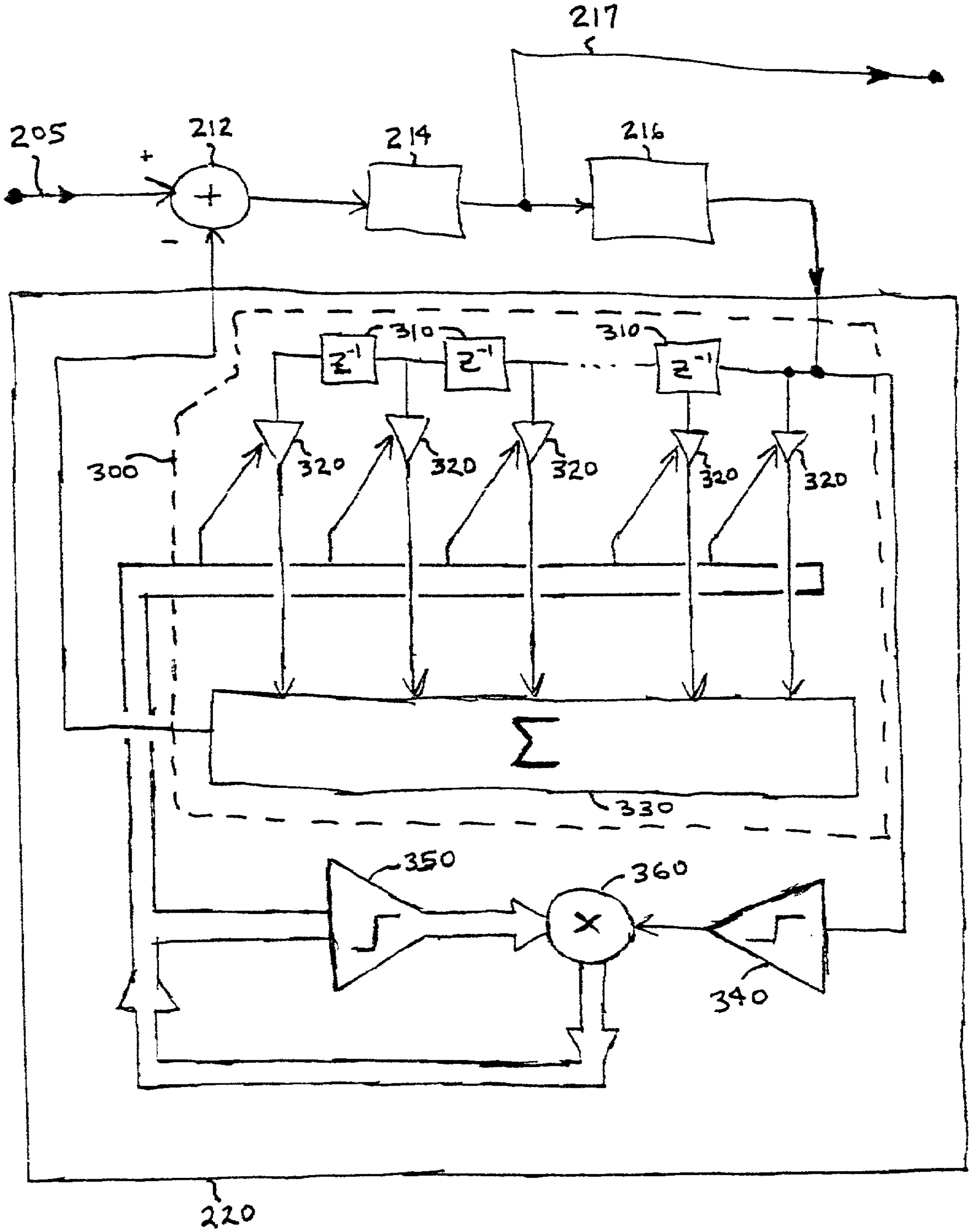
FIG. 3 is a schematic block diagram of a predictor module implemented by the system of FIG. 2.

FIG. 1 schematically depicts functional modules that transmitter 110 and receiver 150 implement in wireless microphone system system 100. FIG. 3 schematically depicts functional modules implemented by a predictor 220 in transmitter 110. All of these functional modules can be suitably implemented by any suitable selection or combination of hardware or software. Functional modules can interact via any suitable routes of interconnection, including hardware (e.g., a bus, dedicated signal lines, etc.), access to shared storage media (e.g., arguments and returned values of function calls in RAM media, dual-access RAM, files residing on hard disk media, etc.), and combinations of hardware and shared media access.

Exemplary transmitter 110 implements functional modules for signal processing and control functions. Functional modules primarily for signal processing include: an amplifier 112 coupled to a microphone 111 for reception of an audio input signal; a coder/decoder module 114 (CODEC) including delta-sigma A/D and D/A converters; a digital signal processor 116 (DSP); and an RF transmit module 120 coupled to CODEC 114 via an amplifier 118. Functional modules primarily for control include a microcontroller 122 and an I/O module 124, which couples to microcontroller 122 and to a suitable user interface not shown in FIG. 1.

Exemplary receiver 150 also implements functional modules for signal processing and control functions. Functional modules of receiver 150 that are primarily for signal processing include: an RF receive module 152 coupled to FM transmit module 120 of transmitter 110 via wireless link 15; a CODEC 154 similar to CODEC 114 of transmitter 100; a DSP 156; an amplifier 158 coupled to an analog audio connector for transmission of an audio signal reconstructed by receiver 150; and a digital audio interface module 160 coupled to a digital audio connector for transmission of a digitally represented version of the audio signal. Functional modules of receiver 150 primarily for control include a microcontroller 162 and an I/O module 164, which couples to microcontroller 162 and to a suitable user interface not shown in FIG. 1.

Transmitter 110 and receiver 150 includes some of the same types of functional modules. Both devices include CODECs, DSPs, and microcontrollers. These functional modules can be implemented by similar or identical hardware in both devices, with different software for causing them to operate appropriately in transmitter 110 or receiver 150.

In operation of wireless microphone system 100, a user (not shown) speaks, sings, or otherwise generates audio input at microphone 111, which couples to or is integral with transmitter 110. Amplifier 112 receives the resultant audio signal from microphone 111 and conveys an amplified version of it to CODEC 114. A delta-sigma A/D converter in CODEC 114 conventionally generates a time series of input samples representing amplitude of the continuous-time audio signal at regularly spaced sample times. (Samples occur at "regularly spaced" times when they do not vary enough in their spacing to detract significantly from subsequent discrete-time processing.) These samples pass from CODEC 114 into DSP 116 via a serial connection 46.

DSP 116 performs signal processing, discussed below with reference to FIG. 2, on the input samples to generate compressed error samples in accordance with various aspects of the invention. DSP 116 conveys the compressed error samples back to CODEC 114 via a serial connection 64. CODEC 114 generates an error signal that is a continuous-time analog representation of the sequential error samples. CODEC 114 conveys the error signal through an RF amplifier 118 to RF transmit module 120, which uses it to suitably modulate an RF signal, e.g., with FM at a full-scale deviation of about 70 kHz.

Module 120 transmits the modulated RF signal at a frequency and power level appropriate for reception by receiver 150 within a desired range and RF regulatory jurisdiction. When operating under Part 74 of the United States' F.C.C., for example, module 120 can transmit the RF signal within the frequency range of 500–800 MHz and the output power range of 50–250 mW. Transmit module 120 can include any suitable circuitry, for example an SA7026 PLL integrated circuit marketed by Philips, a VCO employing separate 1204–199 varactor diodes for PLL and modulation control, and successive amplification stages including the NEC85633, NE25139, STNBF520, and ATF-54143 discrete semiconductor devices.

The user of transmitter 110 can control it by suitable human-interface interaction with I/O module 124. For example, the user can monitor audio signal level via sequential "bar graph" LEDs (not shown) and adjust gain of amplifier 112 with a potentiometer or up/down buttons (also not shown) to maintain adequate signal level while avoiding clipping. Input and output conveyed through I/O module 124 passes to and from microcontroller 122 via a suitable digital connection.

When positioned in range of transmitter 110, RF receive module 152 of receiver 150 suitably downconverts and demodulates the RF signal from transmitter 110, e.g., with dual- or triple-conversion superheterodyne downconversion. The resultant receive error signal passes to CODEC 154. A delta-sigma A/D converter in CODEC 154 conventionally generates a time series of samples based on the continuous-time error signal at regularly spaced sample times. These samples pass from CODEC 154 into DSP 156 via a serial connection 146, which performs amplitude expansion on the samples to generate a time series of correction samples. DSP 156 generates a time series of output samples based on summation of the correction samples and a time series of samples it predicts (separately from the predicted samples of DSP 114). Each sample of the time series predicted by DSP 156 is an extrapolation based on a sub-sequence of prior correction samples, i.e., a group of consecutive correction samples that occurred before DSP 156 predicted the sample in question. The expansion, prediction, and other signal processing that DSP 156 performs is discussed in greater detail below with reference to FIG. 2.

Output samples from DSP 156 travel to CODEC 154 via serial connection 164, which reconstructs an audio signal as a continuous-time analog representation of the sequential output samples. CODEC 154 conveys the reconstructed audio signal to an amplifier 158, which couples to a suitable audio connector 159. Exemplary receiver 150 also provides a digital audio output, from DSP 156 through a digital audio interface module 160, at a digital audio connector 161. (FIG. 1 depicts male connectors 159, 161 for simplicity, though audio equipment typically, and preferably, employs chassis-mounted female connectors.) Module 160 converts output samples from the serial or parallel format employed by DSP 156 into a suitable digital audio format, e.g., S/PDIF or AES/EBU.

As mentioned above, a signal-predictive audio transmission system according to various aspects of the invention can be advantageously implemented wherever its benefits are desired. A wireless microphone system employing such transmission need not operate in the specific configuration of exemplary transmitter 110 and receiver 150. For example, one or more application specific integrated circuits (ASICs) or programmable logic devices (PLDs) can be employed instead of, or in addition to, software-controlled DSPs 116, 156. The functions that microcontrollers 122, 162 implement in exemplary system 100 can be performed instead by any DSPs, ASICs, or PLDs employed for signal processing. Even functions implemented by RF transmit and receive modules 120, 152 can be implemented in such digital signal processing components.

Indeed, audio systems of entirely different types than exemplary wireless microphone system 100 can advantageously transmit audio using signal-predictive compression and expansion according to various aspects of the invention. For example, analog microcassette recorders can transmit audio onto a magnetic medium using signal-predictive compression and receive the magnetically recorded audio using a complementary predictive signal reconstruction process.

Figure 2:
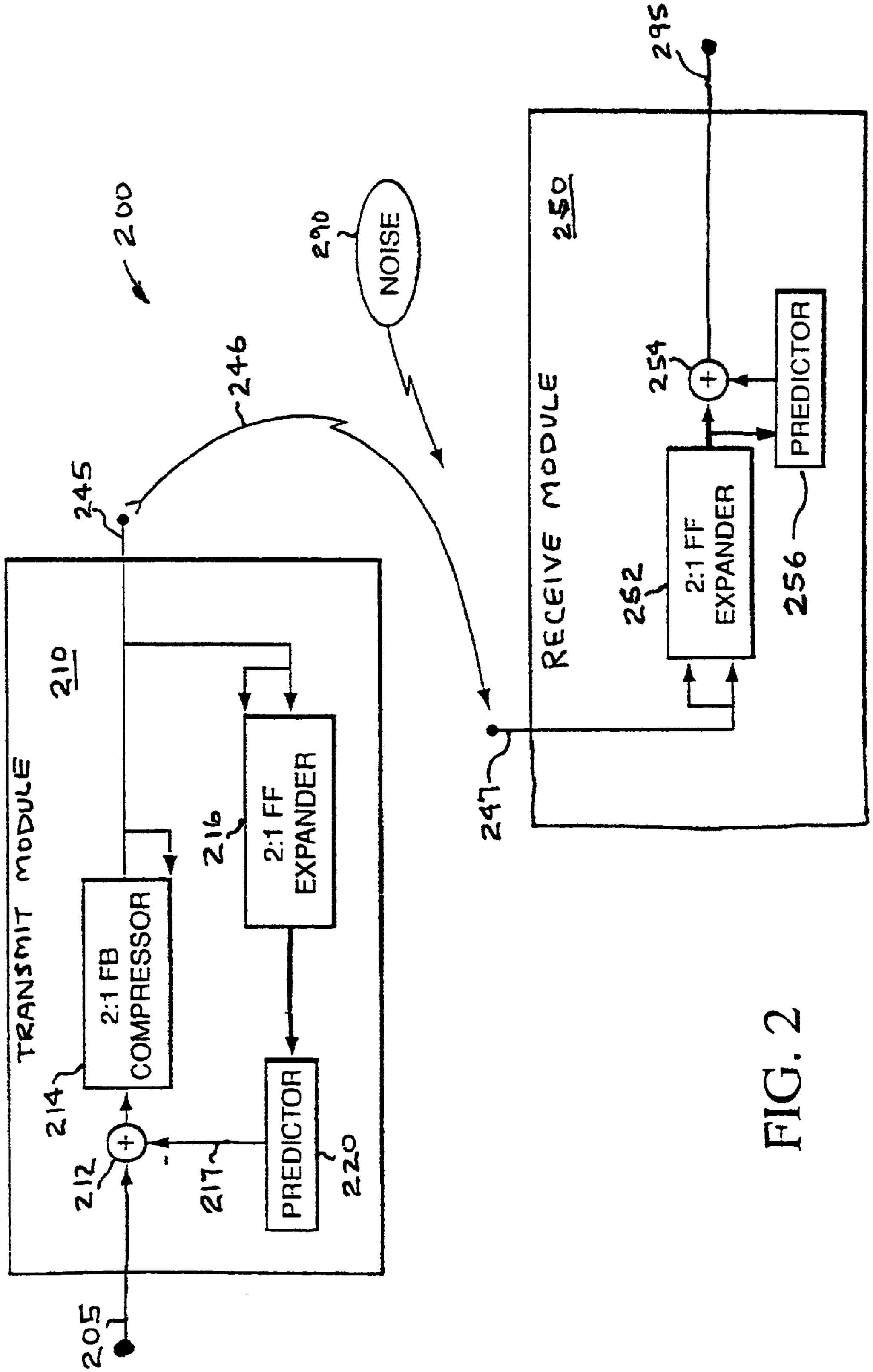
FIG. 2 is a signal flow diagram of signal processing functional modules implemented by a signal-predictive audio transmission system of the invention.

The signal flow diagram of FIG. 2 depicts functional modules implemented in an operating digital signal processing system 200. System 200 can be implemented by any suitable hardware, software, or combination thereof, such as exemplary wireless microphone system 100 (FIG. 1). Responsive to input samples at input 205, transmit module 210 generates error samples at output 245. Functional modules implemented as part of transmit module 210, e.g., by hardware and software of transmitter 110 of FIG. 1, include: a differencing junction 212, a 2:1 feedback-type amplitude compressor 214; a 2:1 feedforward-type expander 216; and a predictor 220, which couples its output to differencing junction 212 via line 217.

Analog circuitry (not shown) conveys correction samples to input 247 of receive module 250 by transmitting an analog signal representing the error samples between modules 210 and 250 via an analog channel 246. An analog channel includes any signal transmission path over which an analog signal can travel without losing substantial information contained in the analog signal levels. Such a channel can include, or exclude, intervening processing of the signal such as companding, modulation, digital encoding, etc. An analog signal is a signal (usually continuous-time) that can, at a given time, have any one of several (often infinite) different possible levels within an amplitude range. In exemplary system 200, noise 290 of analog channel 246, e.g., a wireless link implemented by RF transmit and receive modules 120 and 152 of FIG. 1, adds to the analog signal and degrades quality of the correction samples. As discussed below, transmission system 200 effectively manages this degradation.

Receive module 250 implements, e.g., by hardware and software of receiver 150 of FIG. 1, functional modules including: a 2:1 feedforward-type expander 252; a summing junction 254; and a predictor 256. Receive module 250 generates output samples at output 295 based on summed outputs of expander 252 and receive predictor 256.

Figure 4:
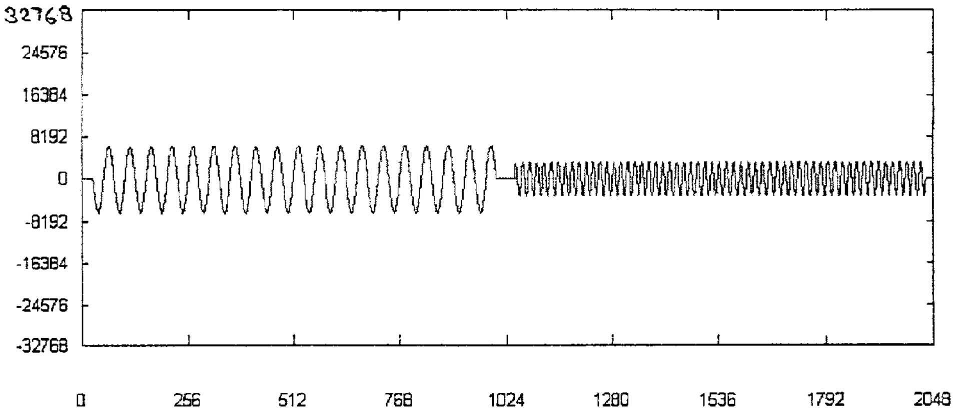
FIGS. 4, 5, and 6 are time-domain signal plots illustrating input, predicted, and error signals, respectively, encountered during operation of the system of FIG. 2 upon transmission of a signal consisting of two sinusoidal bursts.
Figure 5:
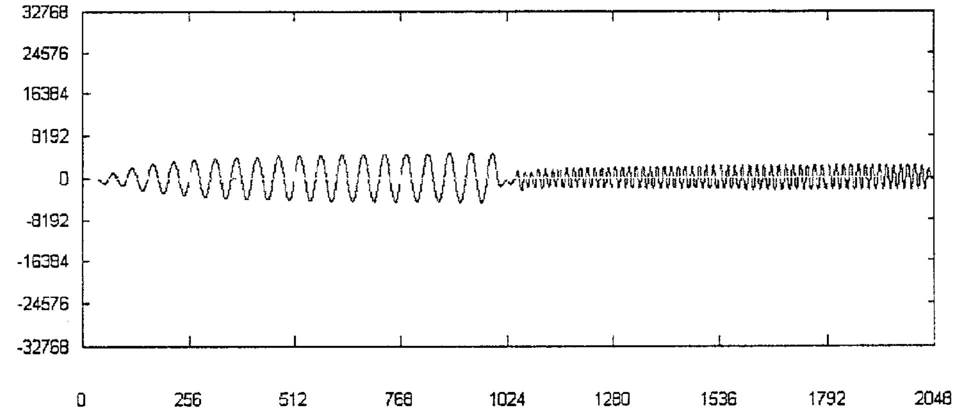
Figure 6:
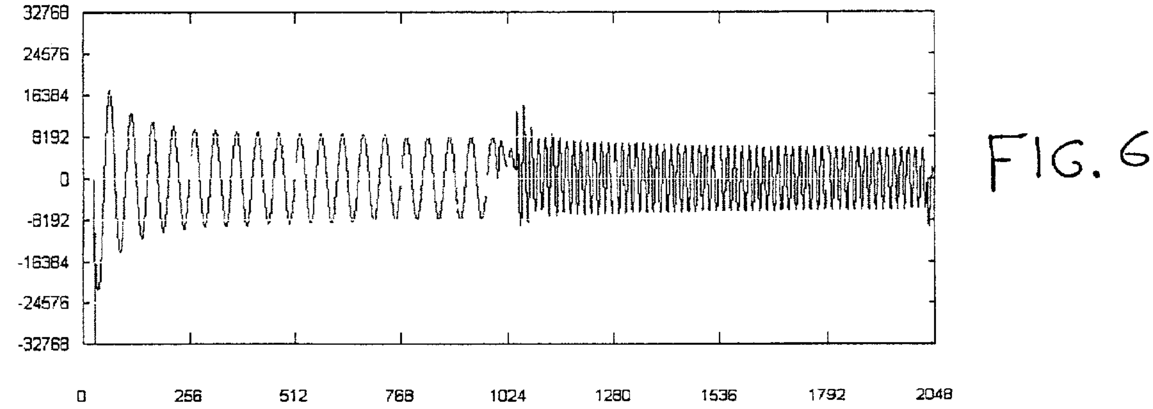

Operation of transmit module 210 may be better understood by an example illustrated by the simulation code of program listing 031–34, 54–57, 61–74 and the plots of FIGS. 4–6 , which result from the simulation. In this example, a time series of 2048 (herein meaning "2048, perhaps more or less") input samples (FIG. 4) is present at input 205. The samples represent amplitude of a continuous-time signal that includes two successive sinusoidal bursts (program listing 31–34). The second burst has three times the frequency and half the amplitude (−6 dB) of the first burst. Differencing junction 212 computes samples representing differences between each input sample and a corresponding predicted sample from predictor 220 (program listing 55–57). Differential samples from junction 212 pass to compressor 214, where they undergo amplitude compression (program listing 61–64) to reduce the overall range of amplitudes between large and small differentials. (A differential is any numerical indicia of a difference between two numerical values, computed for example by simply subtracting the values.)

Amplitude compression according to various aspects of the invention includes any process suitable for reducing the dynamic range required to convey a signal such that a complementary expansion process can faithfully reconstruct the signal. As in all the functional modules illustrated in FIGS. 2–3, any suitable selection or combination of hardware or software can perform such a process. When exemplary transmitter 110 of FIG. 1 implements compressor 214, for example, DSP 116 performs the associated compression process by executing suitable machine-language instructions.

A simple example of amplitude compression is the nonlinear transformation of sample amplitudes on a sample-by-sample basis used in μ-law compandors. Compressor 214 employs a more sophisticated and effective amplitude compression process, in which it computes a sidechain factor (program listing 70–72, 228–248) responsive to a time-averaged overall amplitude of a sub-sequence of the differential samples from junction 212. (A sub-sequence of samples includes any contiguous portion of a time series, i.e., multiple sequential samples selected from a stream of sequential samples.) Compressor 214 generates error samples by adjusting amplitude of the differential samples in opposite proportion to the sidechain factor (program listing 209–215). Thus, sub-sequences of error samples having small amplitudes are closer in overall amplitude to sub-sequences of error samples having large amplitudes, compared to the corresponding sub-sequences of small and large differentials on which the error samples are based.

A digital-to-analog conversion module (not shown) of transmit module 210 generates an error signal as a continuous-time representation of the time series of error samples generated by compressor 214. A continuous-time signal is any signal that is not sampled, e.g., a waveform processed exclusively by analog circuitry. Transmit module 210 transmits the signal via analog channel 246 from its output 245 to receive module 250.

Transmit module 210 further includes an expander module 216 that reproduces expansion performed in receive module 250, by amplitude expander 252. The result of this local expansion (program listing 65–69) is a sequence (i.e., time series) of samples on which predictor 220 can base its extrapolations. These samples, having undergone both compression and complementary expansion within transmit module 210, closely match data used by predictor 256 of receive module 250 after that module has performed its own expansion, with expander 252.

Based on the compressed and then expanded samples, predictor 220 (program listing 55–57) predicts samples of a first time series within transmit module 210. Prediction according to various aspects of the invention includes any process that estimates, to a desired degree of accuracy, the expected value of a future sample in a time series based on a number of prior samples in that sequence. As mentioned above, all functional modules depicted in FIGS. 2–3, including predictor module 220, can be implemented by any selection or combination of hardware or software.

Exemplary predictor 220 employs adaptive linear prediction with coefficients updated by a quantized version of the least-mean-squares (LMS) algorithm. Variant linear predictors use continuous (non-quantized) LMS or recursive-least-squares (RLS) algorithms instead. In addition, many known alternatives to LMS- or RLS-adapted linear prediction prediction are available, a few of which are listed below. Published information, some of which is specifically cited below, is readily available for guidance in implementation of these known techniques. (All publicly available information cited below and elsewhere in this application is incorporated herein by reference.)

EXAMPLE TECHNIQUE #1—Pole-zero signal model approximation of Padé, Prony, or Shank for N most recent samples, followed by evaluation of the unit sample response δ[n−k] of the model at sample k+N. M. H. Hayes, *Statistical Digital Signal Processing and Modeling,* ISBN 0-471 59431-8 (1996), pp. 133–160.

EXAMPLE TECHNIQUE #2—Prony's, autocorrelation, or covariance approximation of all-pole signal model in one-step-ahead linear predictor equivalent configuration. Hayes, pp. 160–188. N. S. Jayant and P. Noll, *Digital Coding of Waveforms—Principles and Applications to Speech and Audio*, ISBN 0-13-211913-7 (1984), pp. 64–255.

EXAMPLE TECHNIQUE #3—Multiple linear predictors adapted by LMS algorithm in FIR cascade structure. P. Prandoni and M. Vetterli, An FIR Cascade Structure for Adaptive Linear Prediction, *IEEE Transactions on Signal Processing,* Vol. 46, No. 9 (1998), pp. 2566–2571.

EXAMPLE TECHNIQUE #4—Polynomial curve fit to most recent samples k, k+1, . . . k+N−1, followed by evaluation of the resulting function at sample position k+N. To avoid computational overflow with finite-precision processing (e.g., 32 bits), low values of N appear most feasible.

Exemplary predictor module 220 may be better understood with reference to FIG. 3, which illustrates functional modules of its "quantized LMS" adaptive linear prediction process. These modules include: a series of delay elements 310 for implementing the $z^{-1}$ discrete-time processing operator; a series of scaling modules 320 representing multiplication of each delay-tapped sample by a respective filter coefficient $b_1$; and a summing junction 330. Together these functional modules implement a transversal (FIR) prediction error filter 300, the function of which is discussed below. Predictor 220 further implements functional modules that adapt filter 300 by updating its coefficients. These modules include a 1-bit quantizer 340 that indicates sign (but not magnitude) of the most recently generated prediction error; an arrayed 1-bit quantizer 350 that indicates sign of each previous coefficient value; and a product junction 360 that multiplies each 1-bit quantized coefficient value by the 1-bit quantized prediction error value.

In operation, predictor module 220 effectively applies prediction error filter 300 to a sequence of processed differential (herein, "PD") samples, which are based on differences between (1) previous one-step-ahead predictions of what the input samples values were expected to be, and (2) the input samples that actually occurred. (The PD samples are the cascaded output of compressor 214 and complementary expander 216 of FIG. 2, with the raw differential samples from junction 212 being the input.) By filtering out errors caused by unpredicted variations or "innovations" in the signal at input 205, predictor 220 generates extrapolations that are based more on the cyclic, largely accurate components of its previous predictions than on unavoidable errors induced by such variations.

Predictor 220 gradually updates coefficients (program listing 73–74) represented by scaling modules 320 using a quantized variation of the LMS algorithm. This algorithm adds a suitable offset to each coefficient in an effort to reduce a statistic of mean squared error between the actual output of filter 300 and the output that is desired. In exemplary filter module 300, each offset has a constant magnitude and variable sign. The sign of a given offset is positive when there is agreement between the signs of (1) the most recent PD sample from the cascade of junction 212, compressor 214, and expander 216, and (2) an earlier PD sample, stored in a delay element 310 corresponding to the coefficient for that offset.

For example, when the sign of the most recent PD sample is negative (i.e., the previous input sample on which the PD sample is based wound up being smaller than predicted), any coefficients corresponding to delay elements 310 that contain negative-valued PD samples are made more negative, while coefficients corresponding to delay elements containing positive PD samples are conversely made more positive. The rationale behind this coefficient adaptation may be better understood by examining the operation of prediction error filter 300 as an FIR filter, which is a linear time-invariant system. Any discrete-time signal that may be applied to the filter can be characterized as a sum of harmonically related sinusoids, and the resulting output is the sum of the filter's outputs for each of those signals. Thus, various linear combinations of coefficients of filter 300 define the filter's response to cyclic, sinusoidal input signals having particular cycle periods. Consequently, "shaping" a sequence of coefficients to conform to a particular sinusoidal (i.e, Fourier series) component of the PD sample sequence in delay elements 310 maximizes the filter's response to that component of the prediction error signal, which maximizes the effect of that cyclic (i.e., predictable) component in the next extrapolation of predictor 220.

Figure 13:
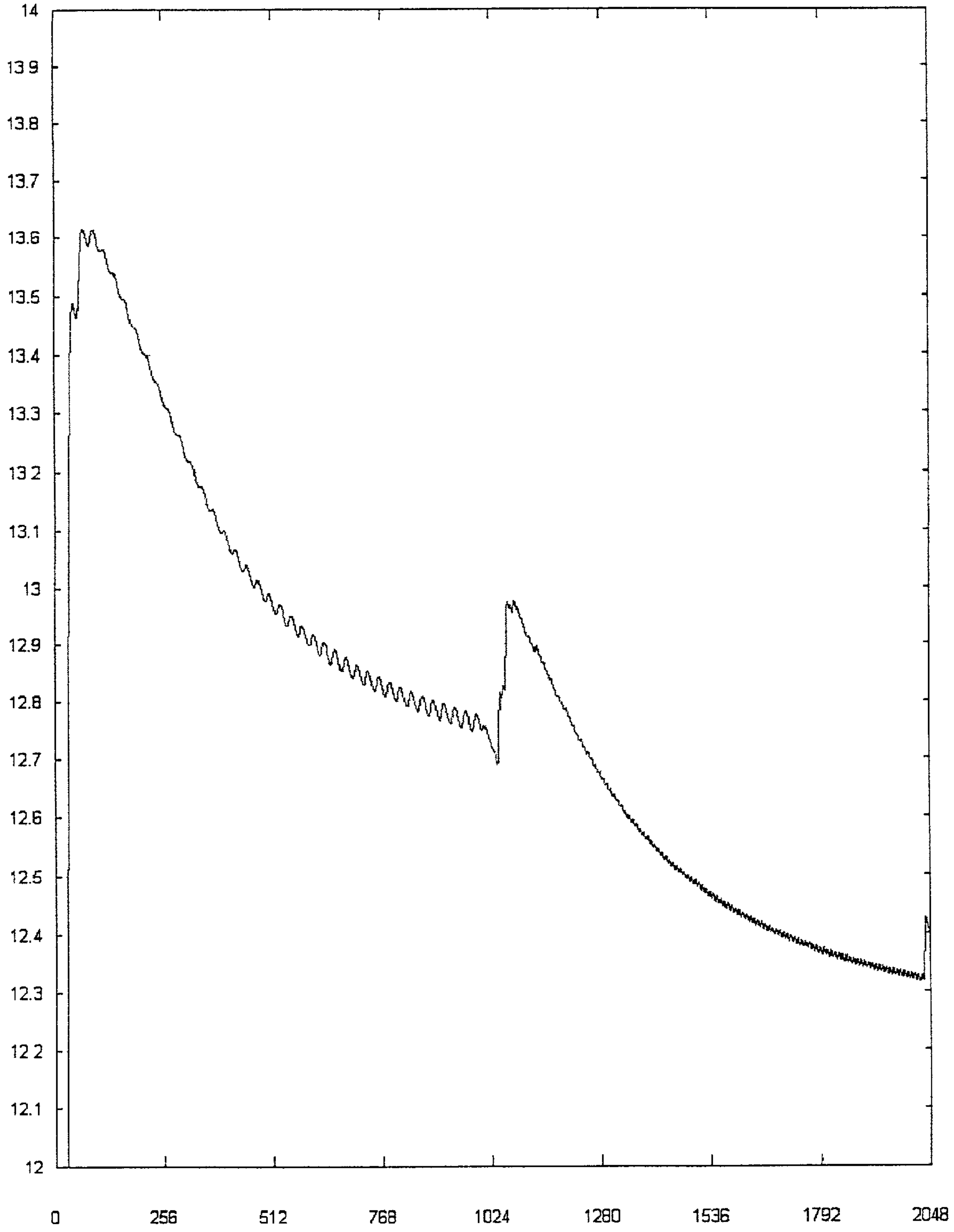
FIG. 13 is a time-domain plot that depicts values of a sidechain factor, which is responsive to a time-averaged overall amplitude of input samples derived from the input signal of FIG. 4.

FIG. 5 illustrates a time series of 2048 predicted samples from predictor 220 (FIG. 2, program listing 55–57) that are based (indirectly, after compression and expansion within module 210) on the input samples illustrated in FIG. 4 (program listing 31–34). FIG. 5 illustrates a corresponding time series of amplitude-compressed error samples (program listing 61–64) at output 245 of transmit module 210. FIG. 13 shows the time-varying values of the sidechain factor used in amplitude-compressing the samples of FIG. 5. Clearly evident in FIG. 13 are lower values of the sidechain factor in the second half of the sample sequence, which compensate for lower signal amplitude in that portion of the input sample sequence of FIG. 4.

Figure 8:
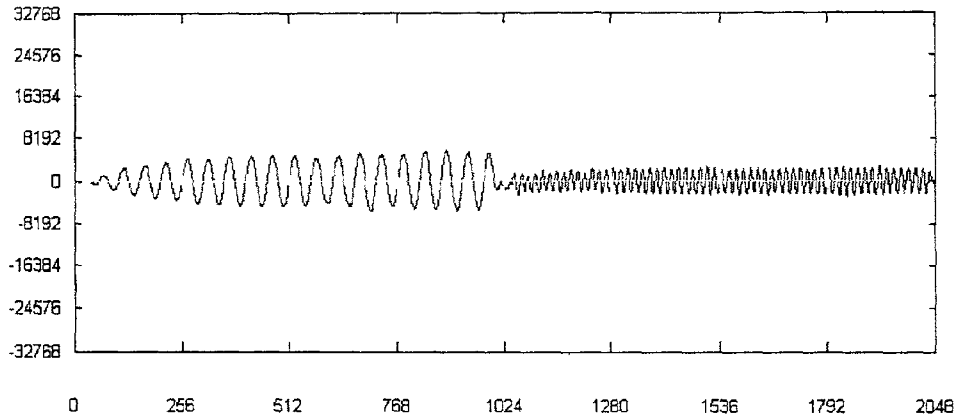
Figure 9:
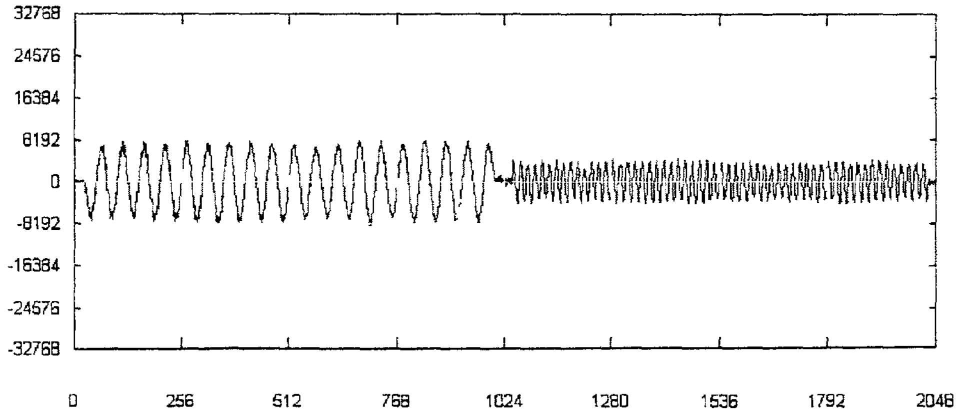
Figure 10:
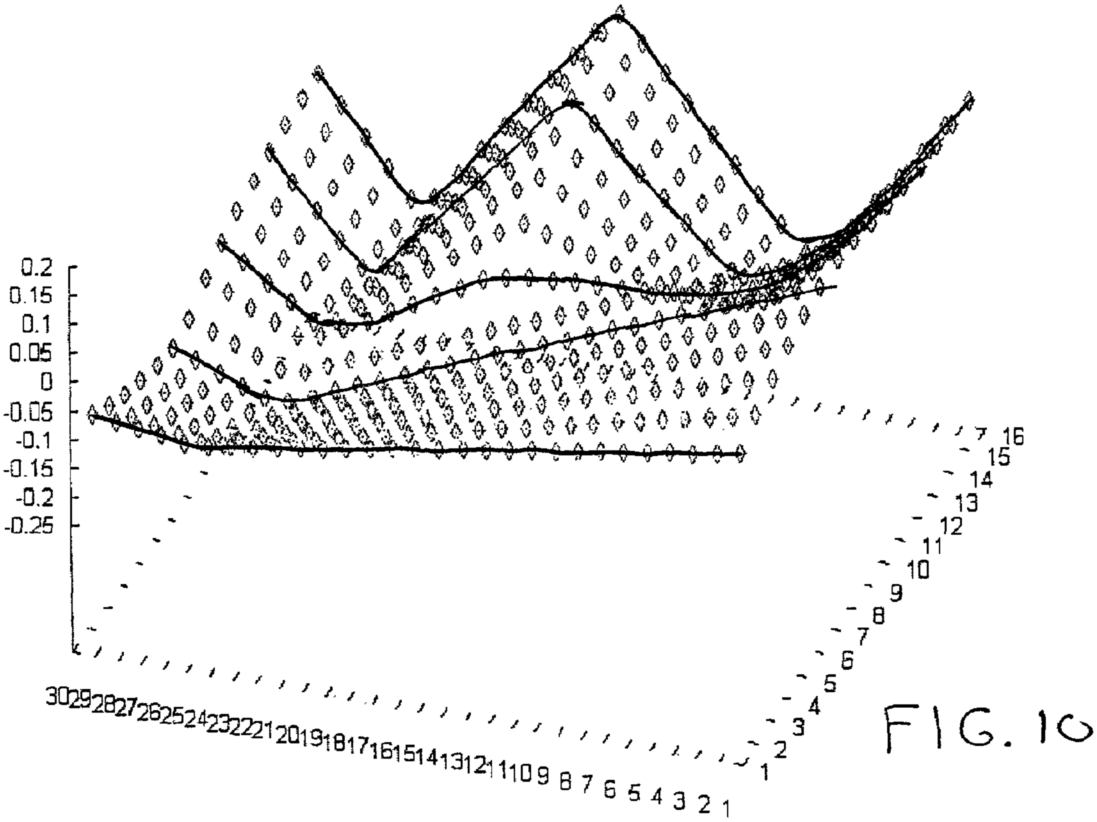
FIG. 10 depicts values of thirty coefficients employed in a transmission predictor of the system of FIG. 2, at sixteen points over the time interval of FIGS. 4–9.
Figure 11:
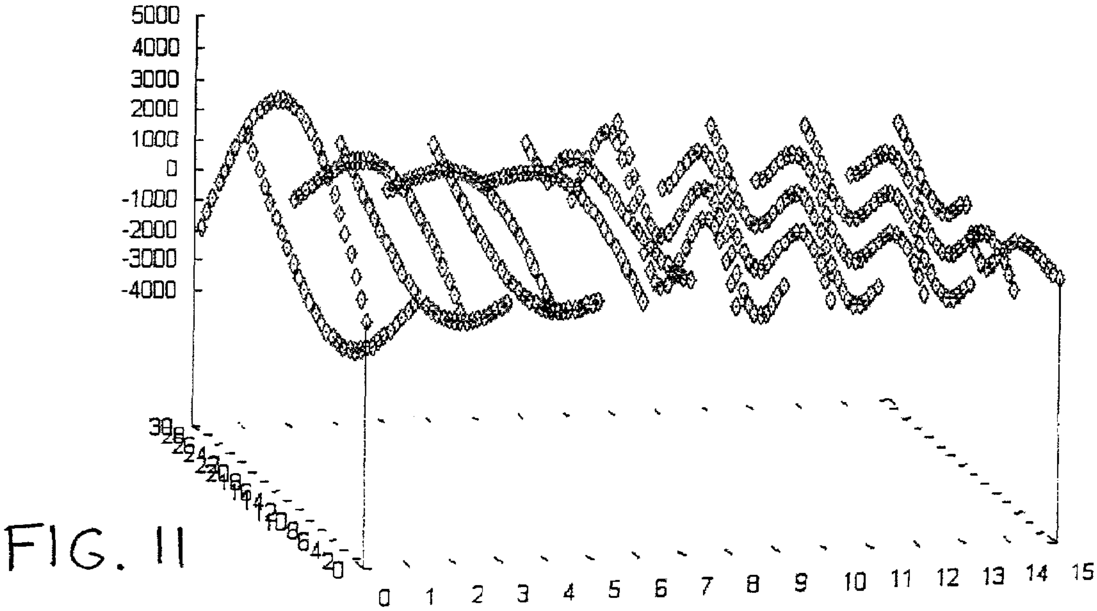
FIG. 11 depicts values of expectation error sample in the transmission predictor of the system of FIG. 2, at sixteen points over the time interval of FIGS. 4–9, each sample being the difference between an original signal sample and a corresponding estimated signal sample.

FIG. 10 depict the values of the thirty coefficients employed in prediction error filter 300 (FIG. 3) at sixteen "snapshots," i.e., sparsely separated points in time, over the 2048-sample time interval of FIGS. 4–9. FIG. 11 depicts the values of the PD sample sequence in delay elements 310 at the same sixteen "snapshot" times. As discussed above, quantized-LMS adaptation of predictor 300 gradually shapes the coefficients illustrated in FIG. 10 to generally conform to the PD sample sequences illustrated in FIG. 11. The quantization of the adaptation algorithm employed in exemplary predictor 220 keeps the coefficients from fully conforming to the sinusoidal shape of the PD sample sequences and the input sample sequences on which they are based. While this "quantization error" reduces predictor accuracy somewhat, it has the advantageous effect of restricting filter 300 from adapting to and passing low-level spurious components such as predictor feedback oscillation.

When predictor 220 adapts coefficients of its prediction error filter 300 to conform with the PD sample sequence stored in the filter's delay modules 310 (FIG. 3), it conforms filter 300 with the spectral content of the time series. A prediction error filter conforms to the spectral content of a given sample time series or sequence when its response to a sinusoidal input of a given frequency is substantially proportional to the magnitude of the time series' spectral content at that frequency. In other words, such a filter conforms to the time series's spectral content when its response over the frequency domain of the filter (from zero frequency to the Nyquist limit) substantially matches the expected (e.g., from interpolation of FFT results) or observed magnitude of the time series' signal components over that domain.

As mentioned above, a discrete-time signal can be characterized as a sum of harmonically related sinusoids. A sample sequence or time series (the terms are employed interchangeably herein) is simply a time-limited portion of a discrete-time signal and thus can be characterized as a sum of harmonically related, time-limited sinusoids. Perhaps the most common way of characterizing spectral content of a sample sequence is with a record of the frequency and magnitude of each such sinusoid.

Figure 12:
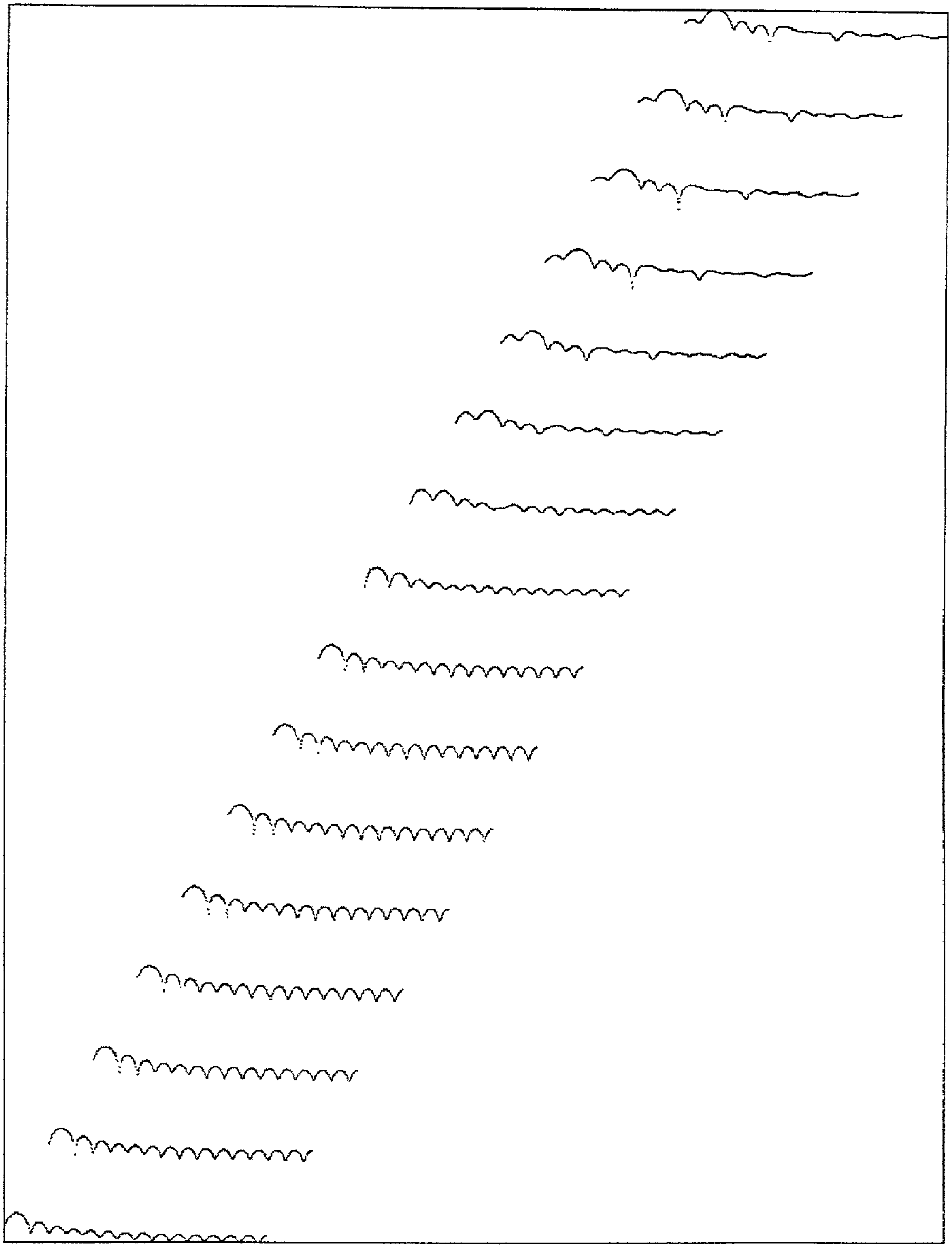
FIG. 12 is a staggered multi-plot illustrating spectral content of coefficients employed during transmission prediction during operation of the system of FIG. 2, at sixteen points over the time interval of FIGS. 4–6.

FIG. 12 is a staggered multi-plot that illustrates spectral content of the coefficients of FIG. 10. The coefficients' spectral content is equivalent to the frequency response of prediction error filter 300. In the first half of the 2048-sample interval, predictor 220 adapts its coefficients to conform with spectral content of the first sinusoidal sequence of input samples of FIG. 4. This first sequence has a low frequency. As a result, filter 300 develops a bandpass frequency response centered around that low frequency. In the second half of the sample interval, predictor 220 gradually updates its coefficients to move away from a bandpass response at the low frequency and conform with spectral content of the second sinusoidal sequence, developing a bandpass response at the higher frequency.

As mentioned above and as illustrated in FIG. 2, error samples at output 245 of transmit module 210 are conveyed to input 247 of receive module 250 via an analog channel 246. Conventional analog circuitry not shown in FIG. 2 modulates and transmits and receives and demodulates the samples with intervening analog transmission. In exemplary system 100 of FIG. 1, CODECS 114, 154 and RF transmit and receive modules 120, 152 perform those operations.

Figure 7:
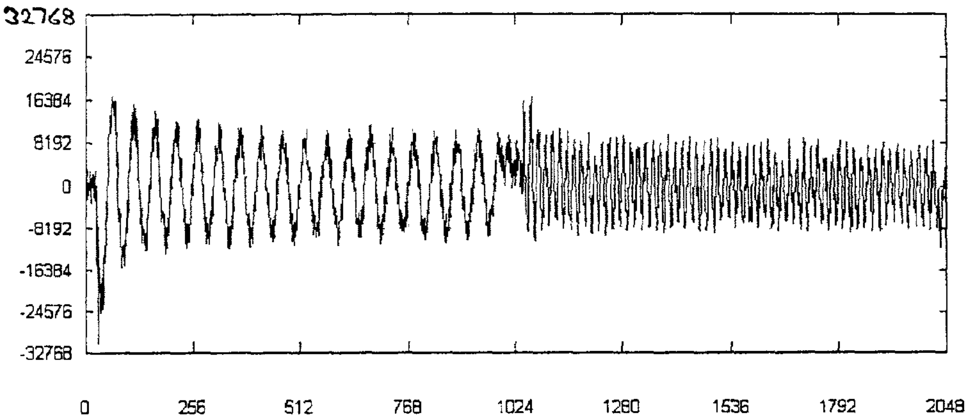
FIGS. 7, 8, and 9 are time-domain signal plots illustrating received (with channel noise), predicted, and reconstructed signals, respectively, encountered during operation of the system of FIG. 2 upon reception of the signal of FIGS. 4–6.

Operation of receive module 250 may be better understood by continued consideration of the example with which the simulation code and resulting plots have thus far illustrated operation of transmit module 210. Received error samples appearing at input 247 represent the starting point of signal processing performed by receive module 250. FIG. 7 illustrates a time series of 2048 such samples that result from simulated transmission of the compressed error samples of FIG. 6 over a noisy analog channel (program listing 122–128). The received error samples are actually reproductions of the error samples transmitted from output 245 of transmit module 210 after amplitude compression, conversion to analog format, transmission via analog channel 246, and conversion back to digital format.

Amplitude expander 252 of receive module 250 (FIG. 2) performs amplitude expansion on the received error samples (program listing 135–139) to substantially reverse amplitude compression performed by compressor module 214. The result is a time series of "correction samples," so named because they correct results of predictor 256 within receive module 250. Predictor 256 operates in a manner similar to predictor 220 of transmit module 210, generating predicted samples based on an FIR prediction error filter (program listing 142) whose coefficients it updates according to a quantized LMS algorithm (program listing 145–146, 187–208).

Summing junction 254 adds each correction sample from expander 252 to a corresponding predicted sample from predictor 256 (program listing 143–144). The result is a time series of reconstructed samples that appear on output 295 of receive module 250. FIG. 9 illustrates a time series of 2048 reconstructed samples at the output of receive module 250 as simulated in program listing 131–162. FIG. 8 illustrates a time series of 2048 predicted samples from predictor 256, as simulated in program listing 141–142.

The significant performance benefits of signal transmission using signal prediction and compression according to various aspects of the invention can be better appreciated by reference to the signal plots of FIGS. 14–36. These plots illustrate outputs of the simulation example discussed above (FIGS. 14–19) and other simulation examples discussed below.

Figure 14:
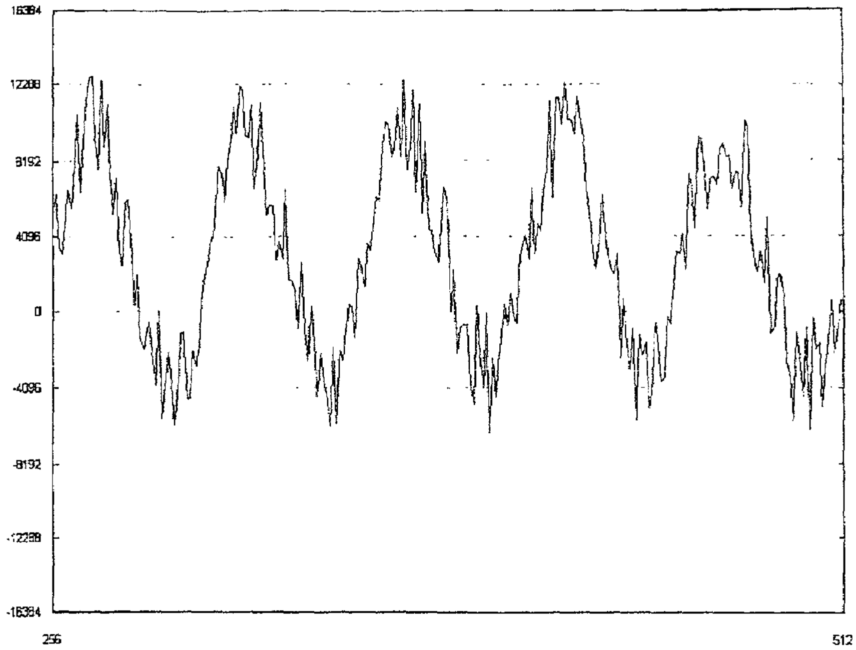
FIG. 14 is a time-domain plot illustrating the input signal of FIG. 4, during a portion of its first sinusoidal burst, after conventional, direct transmission over the noisy channel of FIG. 2.
Figure 15:
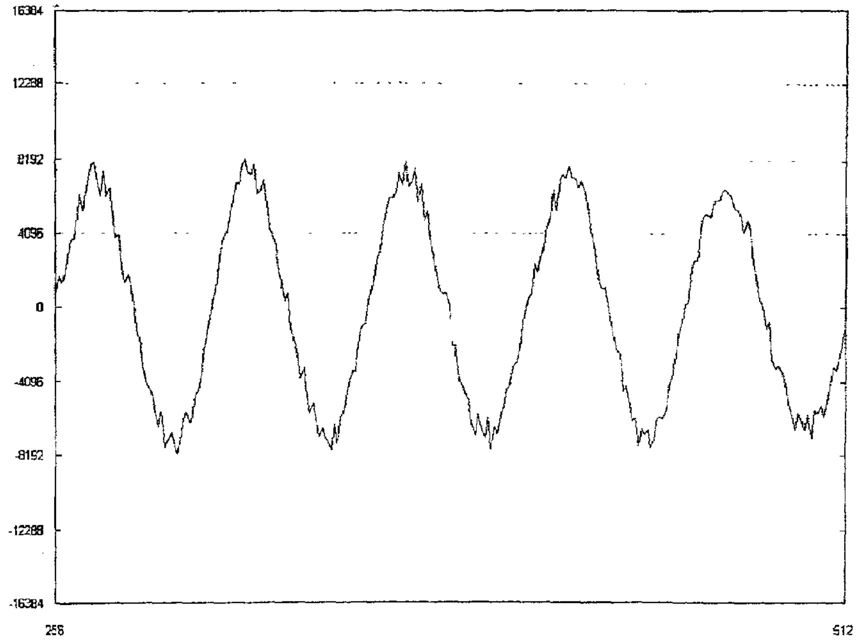
FIG. 15 is a time-domain plot over the same interval as FIG. 14, illustrating the reconstructed signal of FIG. 9 after transmission over the noisy channel of FIG. 2 with noise-suppressing compression according to various aspects of the invention.
Figure 16:
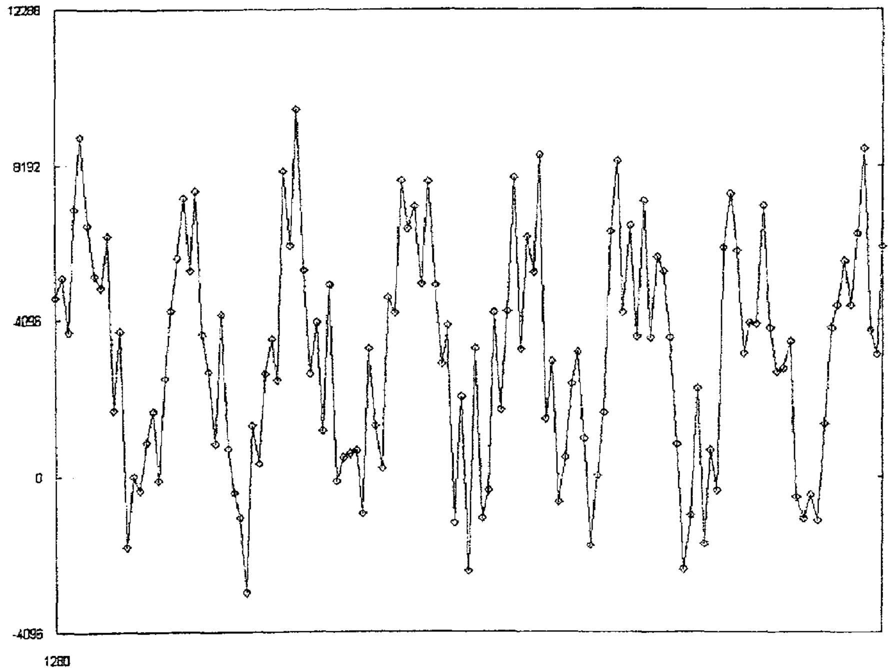
FIG. 16 is a time-domain plot illustrating the input signal of FIG. 4, during a portion of its second sinusoidal burst, after conventional, direct transmission over the noisy channel of FIG. 2.
Figure 17:
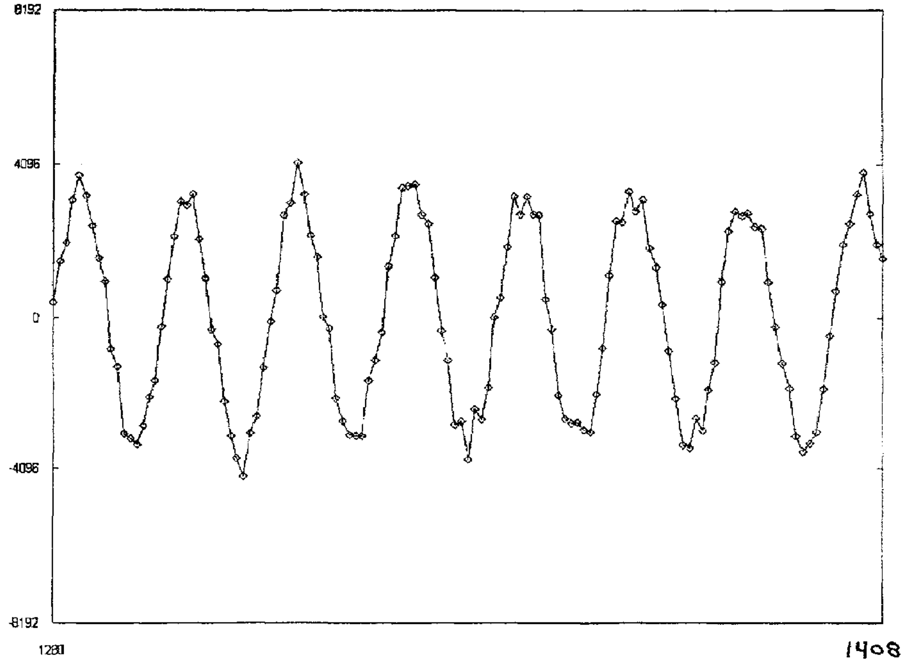
FIG. 17 is a time-domain plot over the same interval as FIG. 16, illustrating the reconstructed signal of FIG. 9 after transmission over the noisy channel of FIG. 2 with noise-suppressing compression according to various aspects of the invention.

The time-domain signal plots of FIGS. 14–15 illustrate samples of the input signal of FIG. 4 with, respectively, (1) conventional transmission and (2) transmission via exemplary system 200, as simulated in the code of the program listing, over a noisy analog channel. The portion of the input signal shown is between sample 256 and sample 512, approximately the midpoint of the low-frequency portion of the signal. The advantageous reduction in noise that transmission that system 200 offers is clearly evident. The noise reduction that can be obtained with transmission according to various aspects of the invention makes itself even more apparent in the signal plots of FIGS. 16–17. These plots illustrate transmission (over the same noisy channel) of a high-frequency portion of the input signal of FIG. 4, conventionally (FIG. 16) and with transmission system 200 (FIG. 17). The amount of noise superimposed on the sinusoidal signal is dramatically reduced in FIG. 17.

Figure 18:
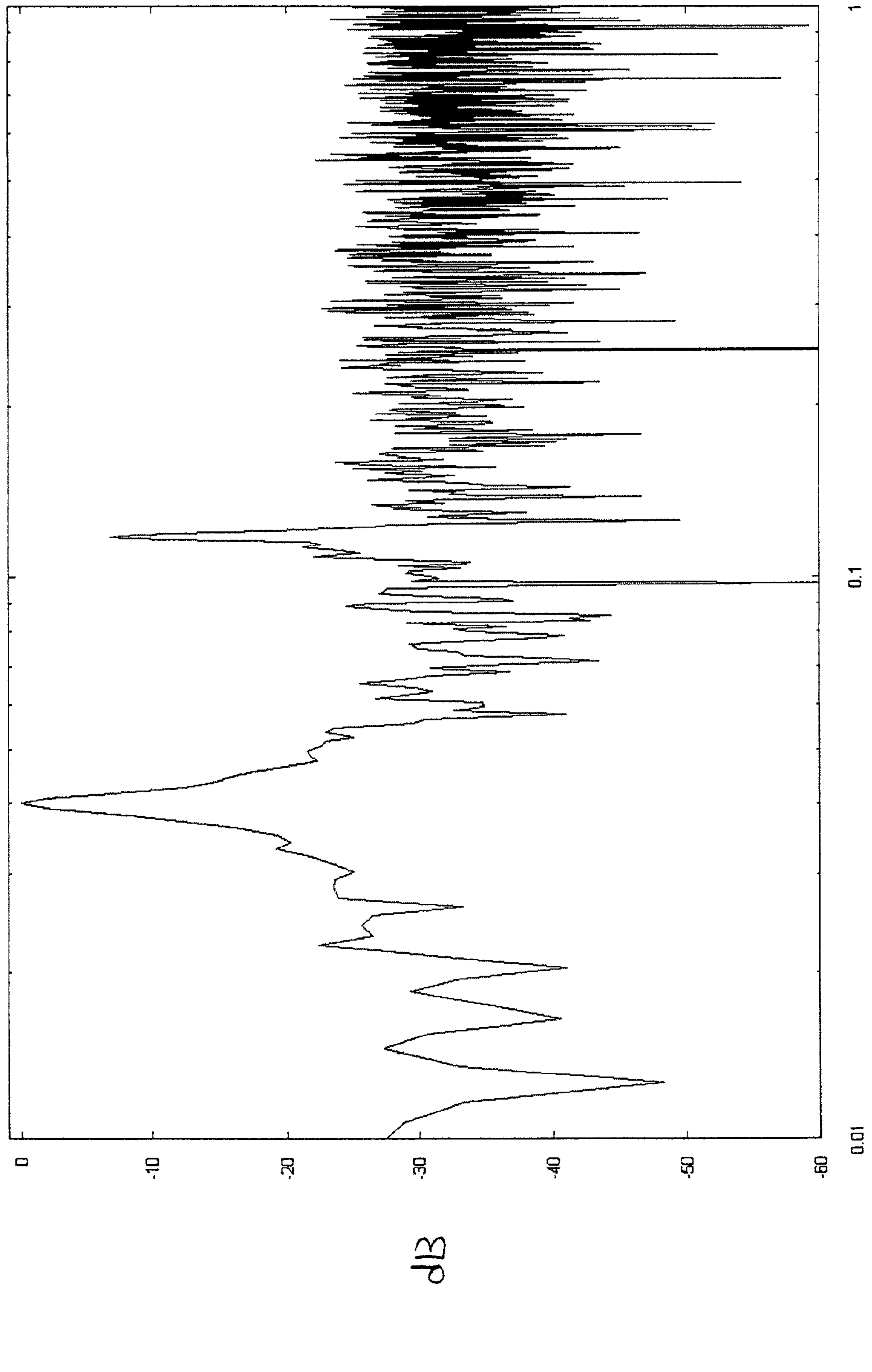
FIG. 18 is a frequency-domain plot of the signal of FIG. 16 illustrating an out-of-band noise floor of about −26 dBc with conventional, direct transmission over the noisy channel of FIG. 2.
Figure 19:
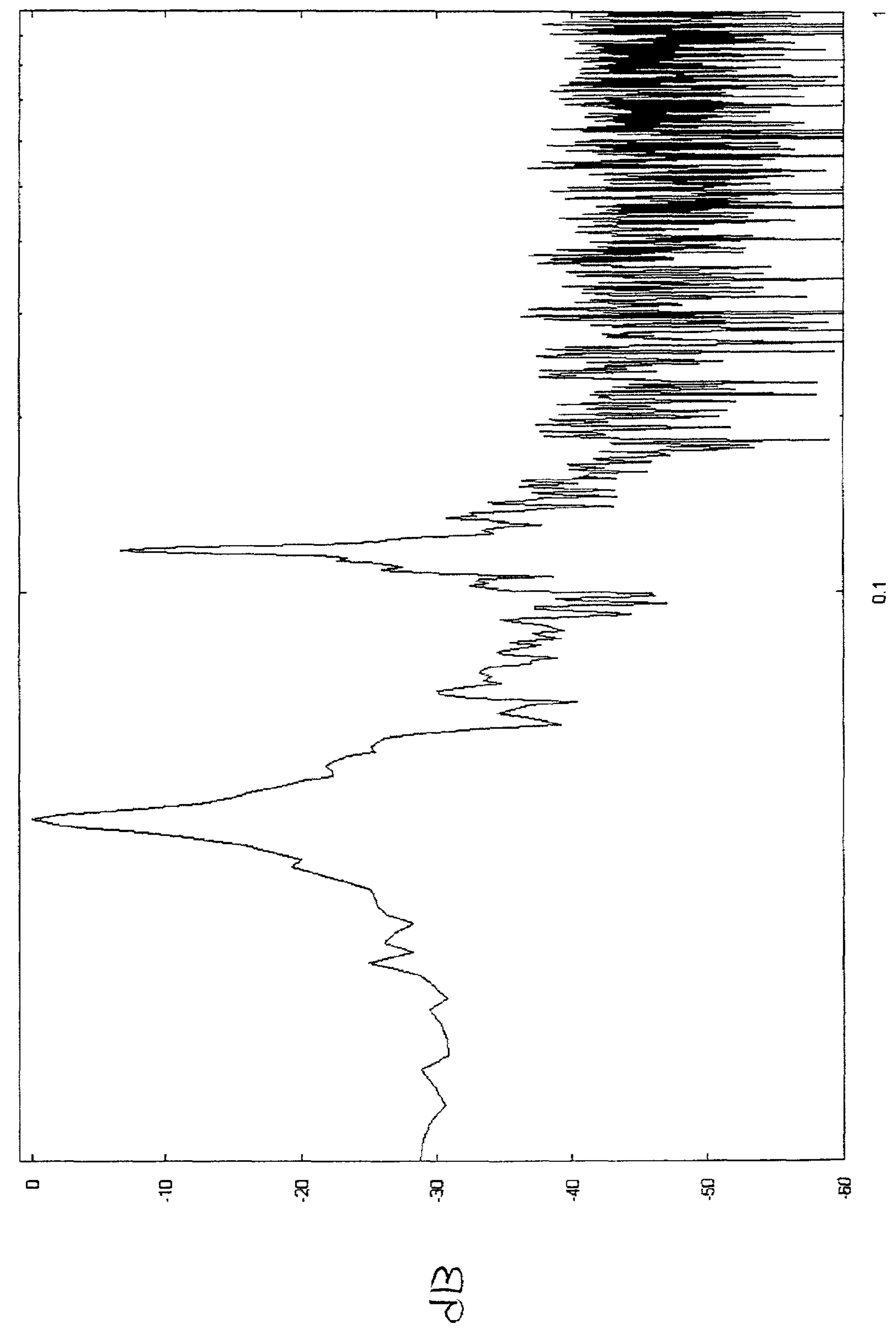
FIG. 19 is a frequency-domain plot of the signal of FIG. 17 illustrating an out-of-band noise floor of about −39 dBc with noise-suppressing, compressed transmission over the noisy channel of FIG. 2, in accordance with various aspects of the invention.

The spectral plots of FIGS. 18–19 provide another view of how effectively system 200 transmits the input signal of FIG. 4 over a noisy channel (analog channel 246 of FIG. 2). FIG. 18 illustrates, in the frequency domain, the two tones of the input signal along with channel noise 290 after conventional transmission over the channel. FIG. 19 illustrates the two tones along with channel noise that has been suppressed by transmission with system 200.

The different noise floors of the signals whose spectral content is shown in FIGS. 18 and 19 illustrates a significant benefit of predictive signal transmission according to various aspects of the invention. The prediction error filter of predictor 256 attenuates noise on its input, which the filter treats as unpredictable signal variations or innovations. Thus, predictor 256 significantly reduces the noise level in spectral regions removed from the spectra of the two main signal components, i.e., the higher frequencies along the logarithmic frequency scale. It is in these otherwise quiet spectral regions where noise is most noticeable to the ear, and the advantageous use of an adaptive predictor in system 200 provides a significant psychoacoustic enhancement to the quality of the reconstructed signal depicted in FIG. 19.

The simulation example discussed above generates the input signal of FIG. 4 with the code of program listing 31–34. To provide another example, the simulation can also generate the swept square wave input of FIG. 20 with the code of program listing 35–38. FIGS. 21–26 are signal plots depicting various signals generated in this example as a result. FIG. 21 depicts predicted samples that predictor 220 generates based (indirectly) on the input samples of FIG. 20, analogous to the predicted samples of FIG. 5 that are based on the input samples of FIG. 4. The Gibb's phenomenon oscillations on the predicted square waves are due to the fact that prediction error filter 300 of predictor 220 can only develop bandpass responses for a limited number of the square waves' harmonics.

Figure 22:
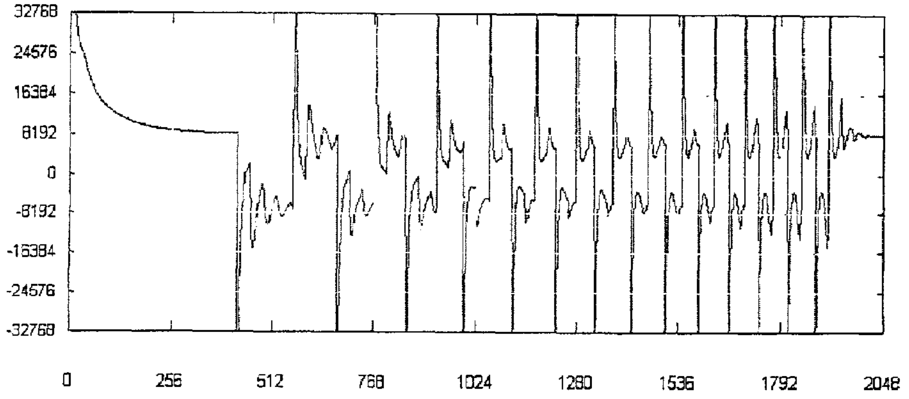
Figure 23:
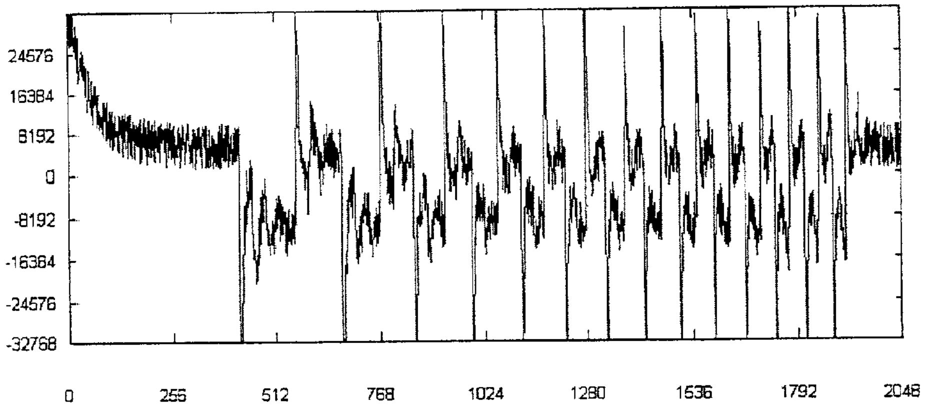
FIGS. 23, 24, and 25 are time-domain signal plots illustrating received (with channel noise), predicted, and reconstructed signals, respectively, encountered during operation of the system of FIG. 2 upon reception of the signal of FIGS. 20–22.

FIG. 22 depicts amplitude-compressed samples at output 245 of transmit module 210, which are analogous to those of FIG. 6. FIG. 23 depicts received samples encountered at input 247 of receive module 250, which are analogous to those of FIG. 7. A significant portion of the received samples' signal content is in the high-frequency spikes at the square wave transitions. This high-spectral content corrects the shortfall in high-frequency harmonic content in the predicted samples of FIG. 24, which again is due to Gibb's phenomenon from limited harmonic predictions of predictor 256.

Figure 24:
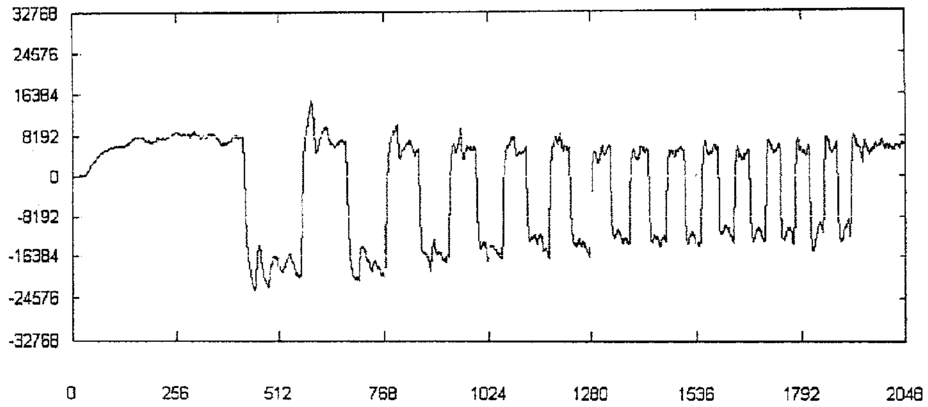
Figure 25:
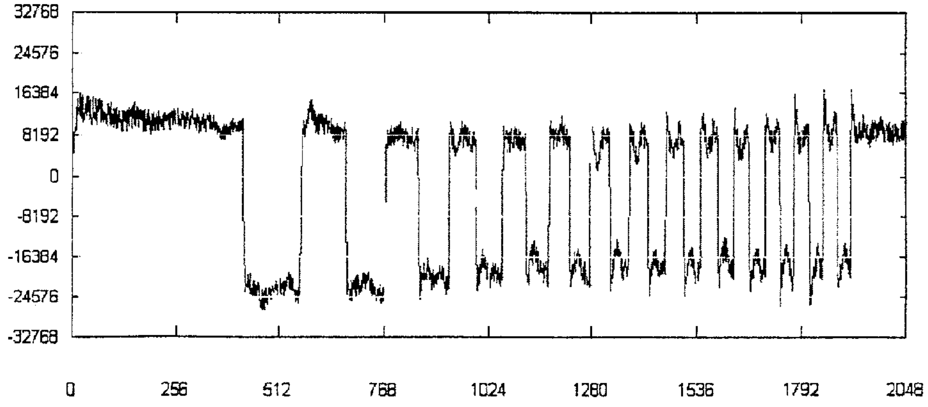

FIG. 24 depicts predicted samples from predictor 256, which are analogous to those of FIG. 8. The output of system 200 for the swept square wave input signal of FIG. 20, as simulated by code of the program listing, is illustrated in FIG. 25. Despite the considerable noise on the received samples of FIG. 23, and the limited ability of predictors 220, 256 to reproduce harmonics of the square waves, system 200 is able to reproduce the input signal of FIG. 20 with substantial faithfulness and noise reduction, especially at the lower square wave frequencies. It is at those frequencies where the human ear places the highest demands on signal reproduction, and this example thus illustrates another psychoacoustic benefit of predictive signal transmission according to various aspects of the invention.

Figure 20:
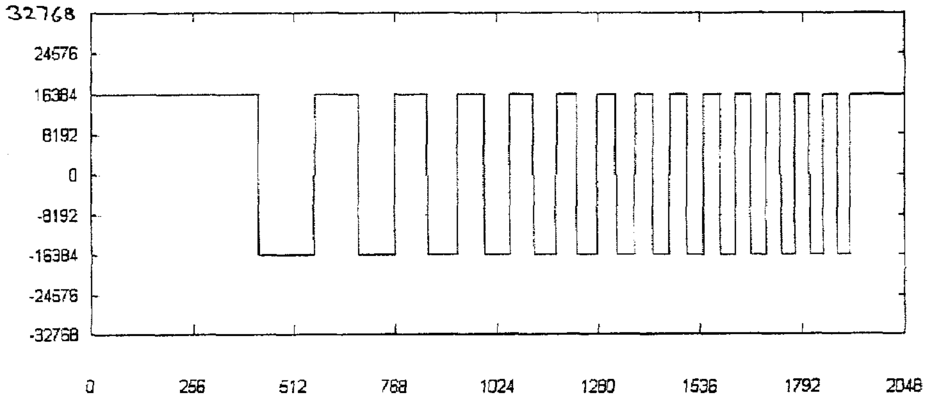
FIGS. 20, 21, and 22 are time-domain signal plots illustrating input, predicted, and error signals, respectively, encountered during operation of the system of FIG. 2 upon transmission of a frequency-swept square wave signal.
Figure 21:
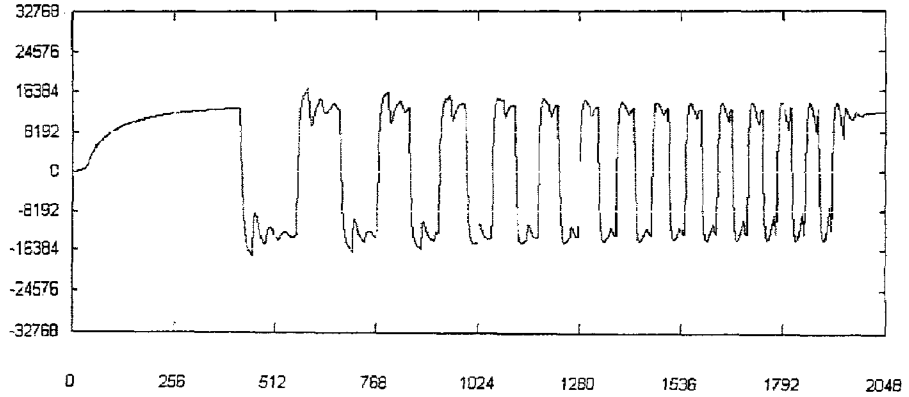
Figure 26:
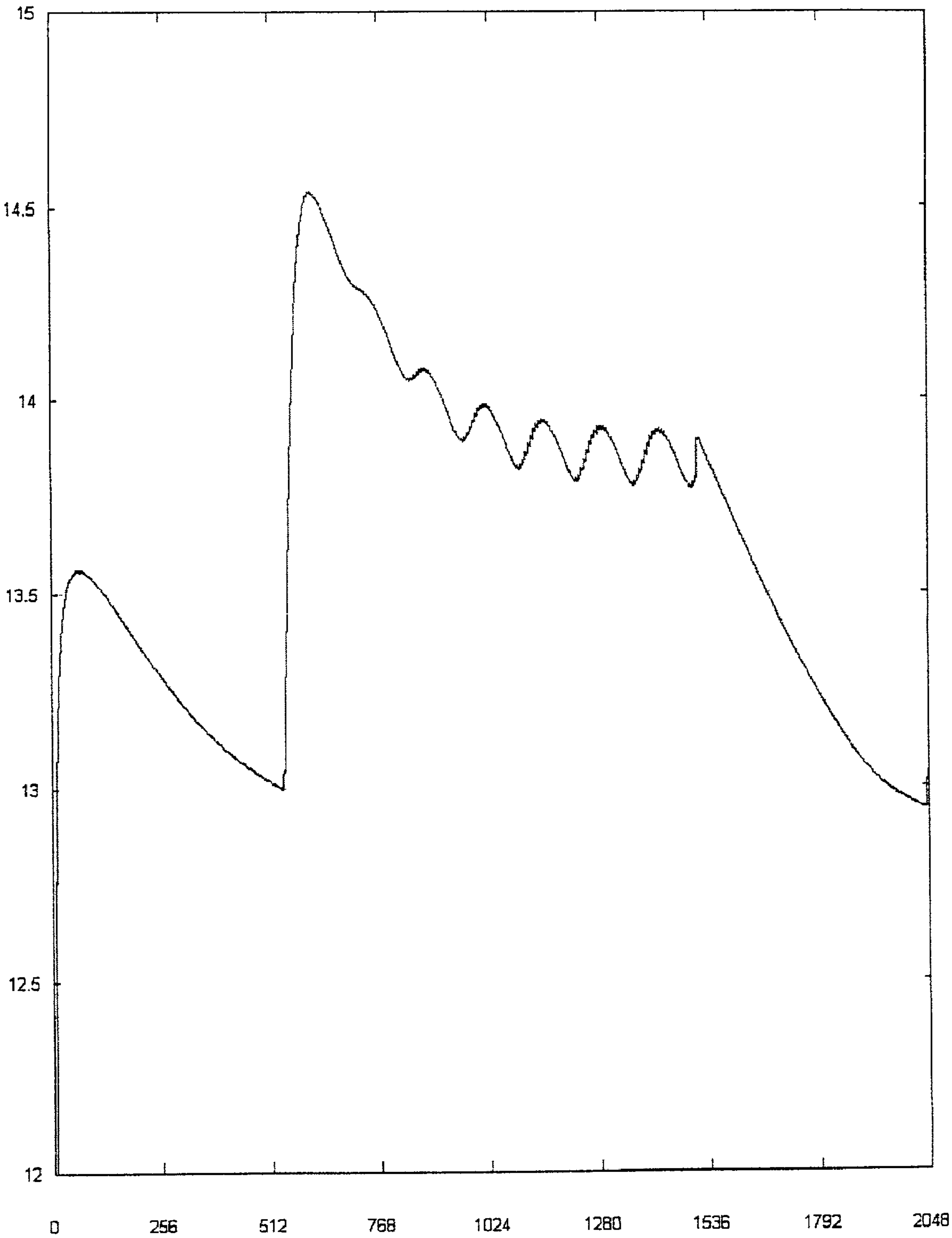
FIG. 26 is a time-domain plot that depicts values of a sidechain factor, which is responsive to a time-averaged overall amplitude of input samples derived from the input signal of FIG. 20.

FIG. 26 illustrates the sidechain factor employed in compressor 214 (FIG. 2, program listing 61–64, 70–72) with the square wave input of FIG. 20. Variations in the sidechain factor are visible, which result from the dramatic changes in amplitude of the square wave signal. However, the gradual attack and release of the sidechain computation (program listing 228–248) keeps the sidechain factor fairly close to a constant value of fourteen over the length of the signal.

Figure 27:
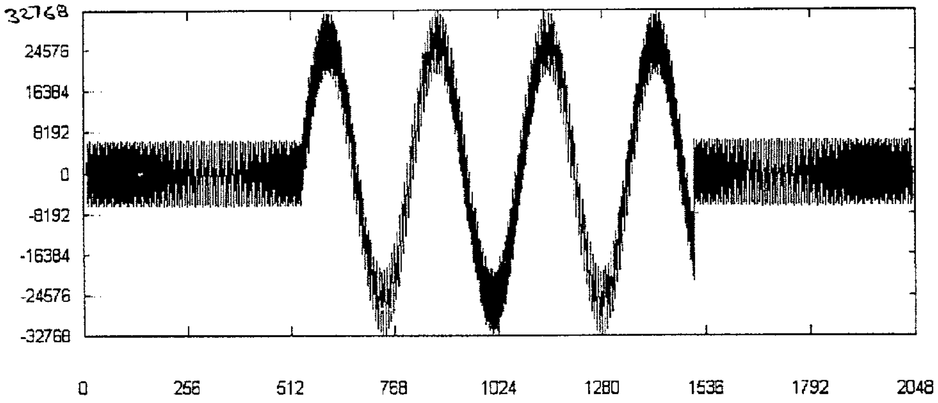
FIGS. 27, 28, and 29 are time-domain signal plots illustrating input, predicted, and error signals, respectively, encountered during operation of the system of FIG. 2 upon transmission of a signal consisting of a low-frequency sinusoidal burst with a continuous high-frequency sinusoid.

Another example provided by the simulation uses as its input the linear combination of tones depicted in FIG. 27. This example illustrates the lack of signal distortion associated with companding and prediction performed by system 200.

Figure 28:
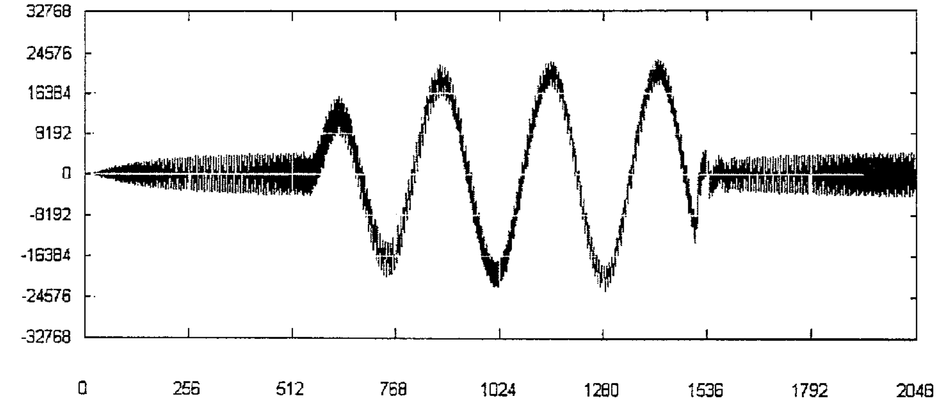

The code of program listing 39–47 generates the simulated input signal of FIG. 27. FIGS. 28–36 are signal plots depicting various signals generated in this example as a result. FIG. 28 depicts predicted samples that predictor 220 generates based (indirectly) on the input samples of FIG. 20, analogous to the predicted samples of FIGS. 5 and 21 that are based on the input samples of FIGS. 4 and 20, respectively. Predicted samples of FIG. 28 show how predictor 220 gradually adapts as its prediction error filter 300 first converges to the high-frequency tone, then changes its response to more closely match the low-frequency tone at the center of the sample interval, then returns its response to matching the high-frequency tone once the low-frequency tone quits around sample 1536. This adaptation of the frequency response of prediction error filter 300 can be better appreciated by the multiple spectral plots of FIG. 33. Filter 300 has a high-frequency bandpass response (illustrated in the lower left portion of the staggered multi-plot), then develops a lower frequency response (in the middle portion), then reverts back to a high-frequency bandpass response (in the upper-right portion).

Figure 29:
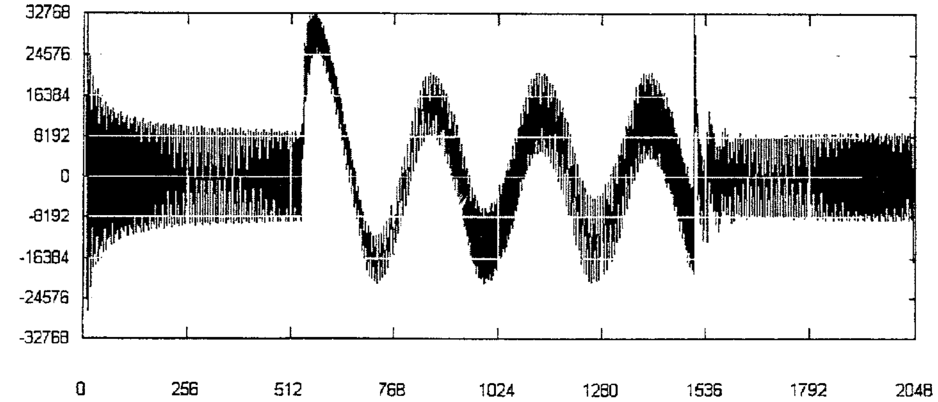
Figure 30:
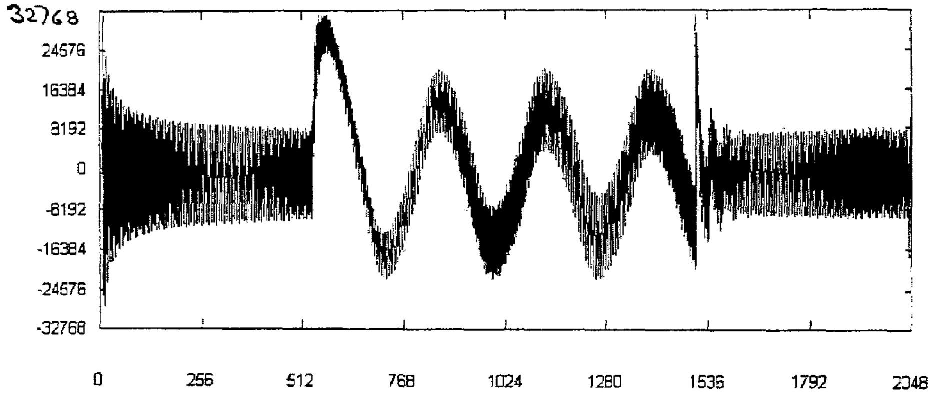
FIGS. 30, 31, and 32 are time-domain signal plots illustrating received, predicted, and reconstructed signals, respectively, encountered during operation of the system of FIG. 2 upon reception of the signal of FIGS. 20–22.

FIG. 29 depicts amplitude-compressed error samples from transmit module 210 (FIG. 2), illustrating how simulated compressor 214 reduces the considerable difference in amplitude between the two tones. FIG. 30 illustrates the received error samples at input 247 of receive module 250. The samples of FIGS. 29 and 30 are substantially identical because the simulated analog channel in this example does not include any noise.

Figure 31:
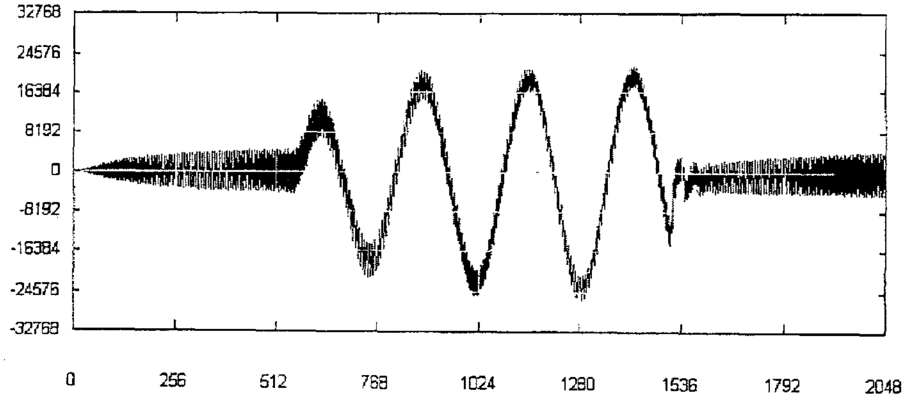
Figure 32:
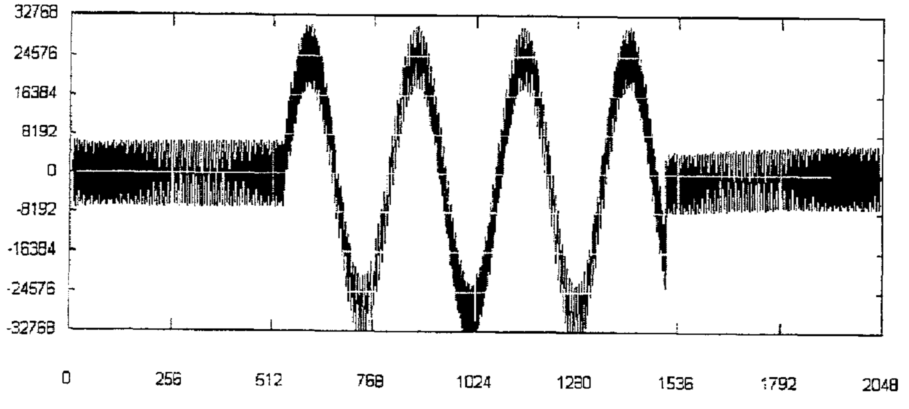
Figure 33:
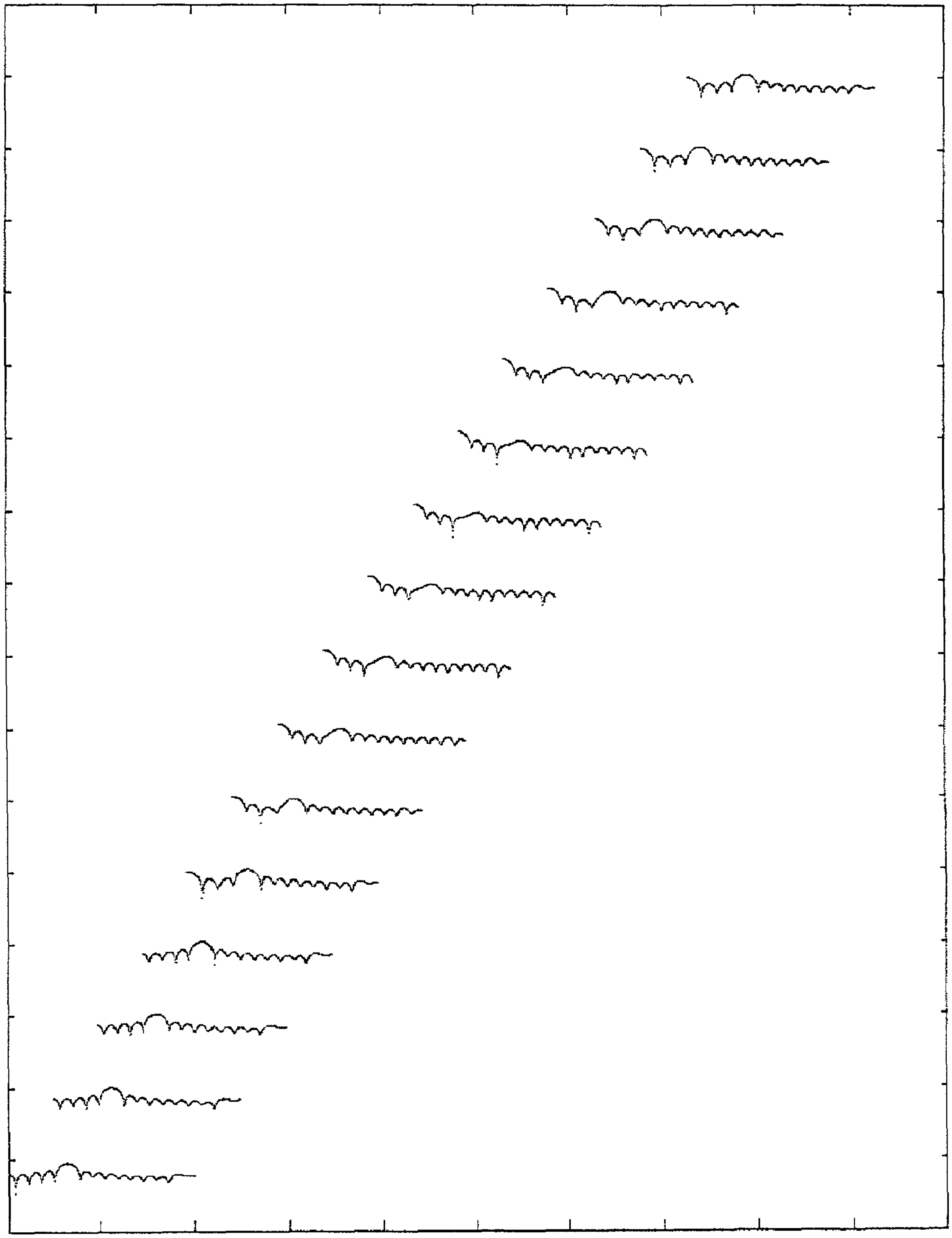
FIG. 33 is a staggered multi-plot illustrating spectral content of coefficients employed in the compression predictor of the system of FIG. 2, at sixteen points over the time interval of FIGS. 27–29.

FIG. 31 depicts prediction samples from predictor 256 indirectly based on the received samples of FIG. 30. FIG. 32 depicts the output samples at output 295 of simulated receive module 250. The samples of FIG. 32 represent a substantially exact reproduction of the input signal of FIG. 27, a fact that can be better appreciated by reference to the spectral plots of FIGS. 34–36.

Figure 34:
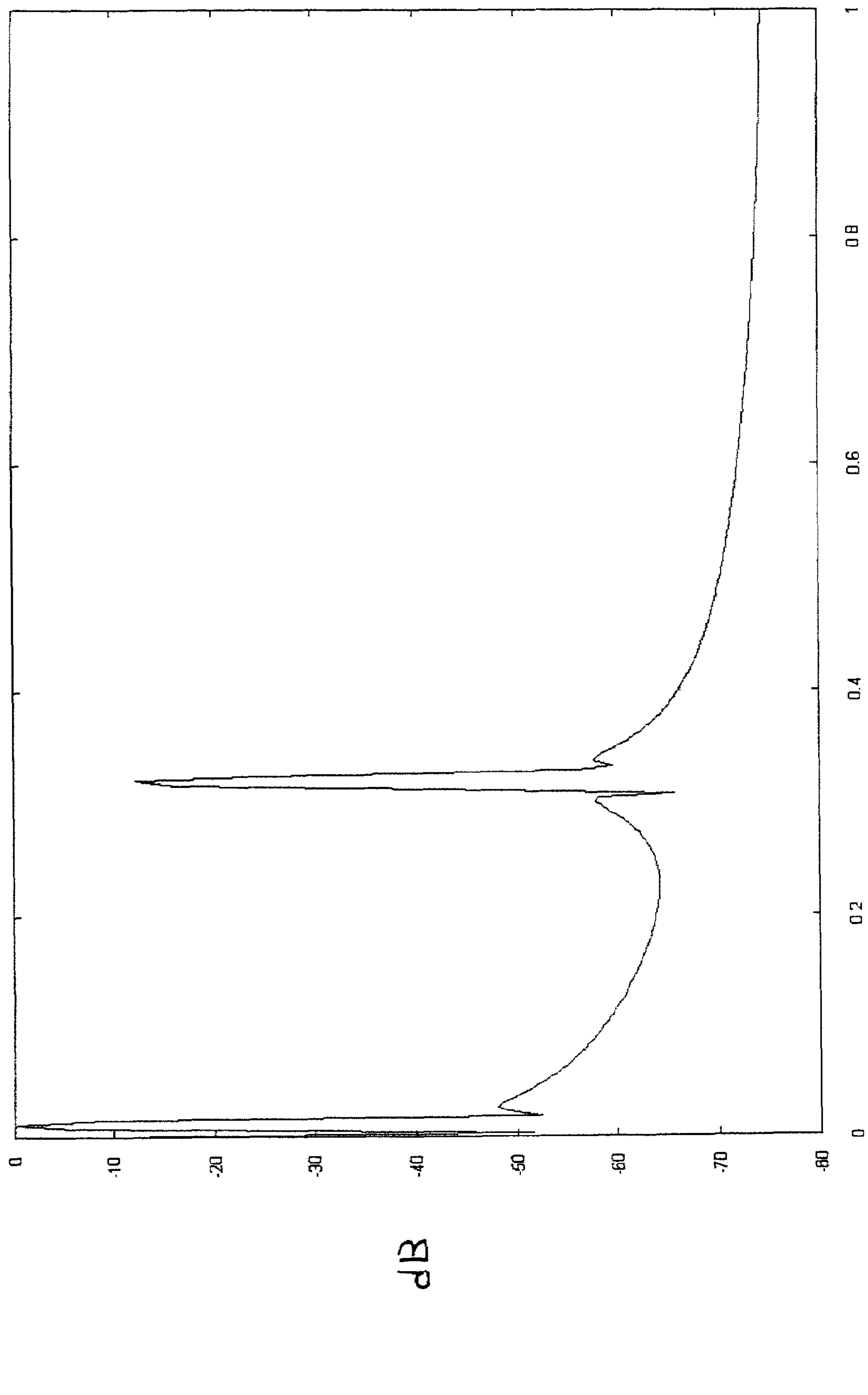
FIG. 34 is a frequency-domain plot of the signal of FIG. 27 illustrating essentially pure spectral content of the two-tone original signal.
Figure 35:
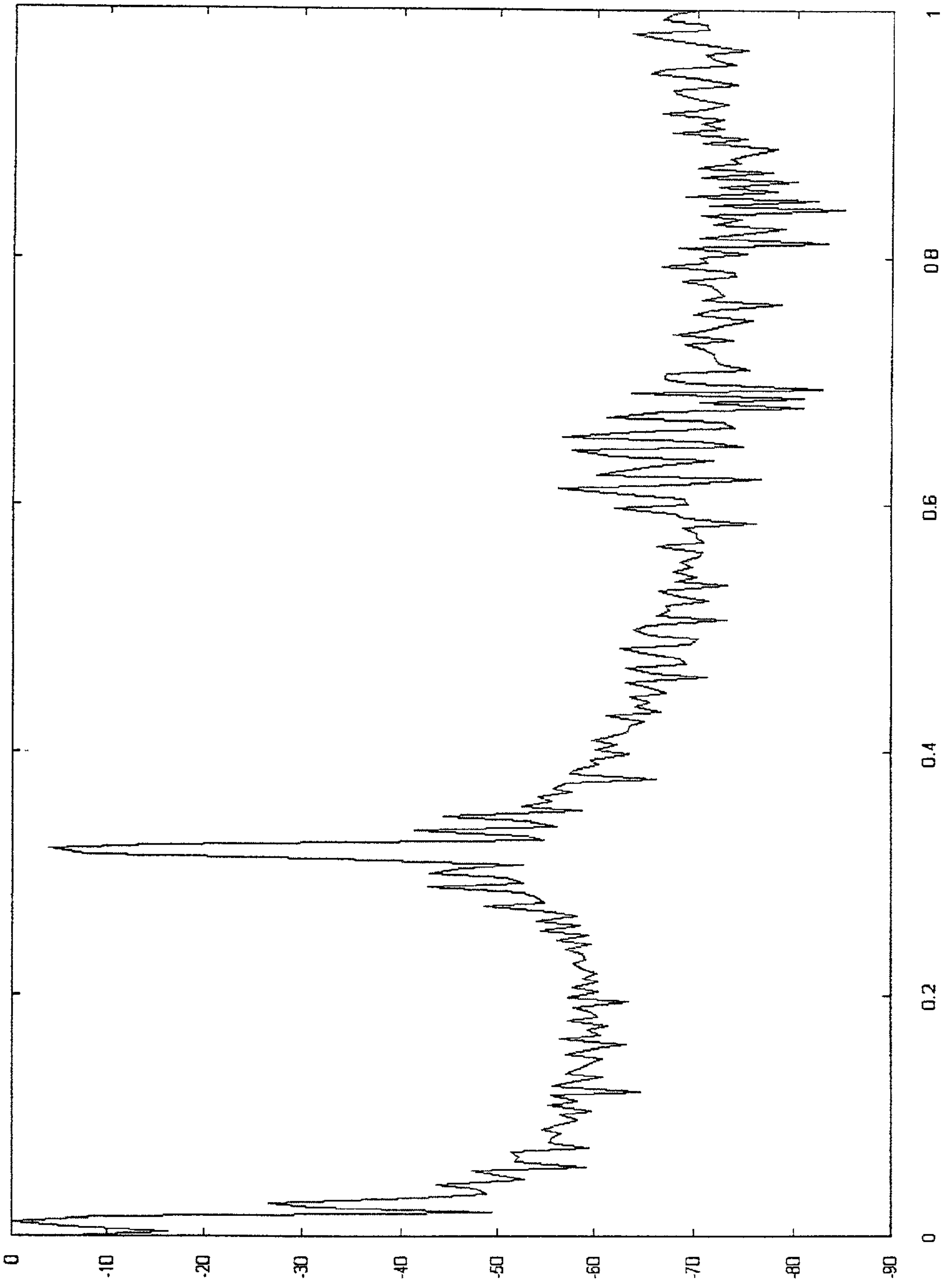
FIG. 35 is a frequency-domain plot of the signal of FIG. 30 illustrating modest spurious content generated by compandor distortion of the received error signal.
Figure 36:
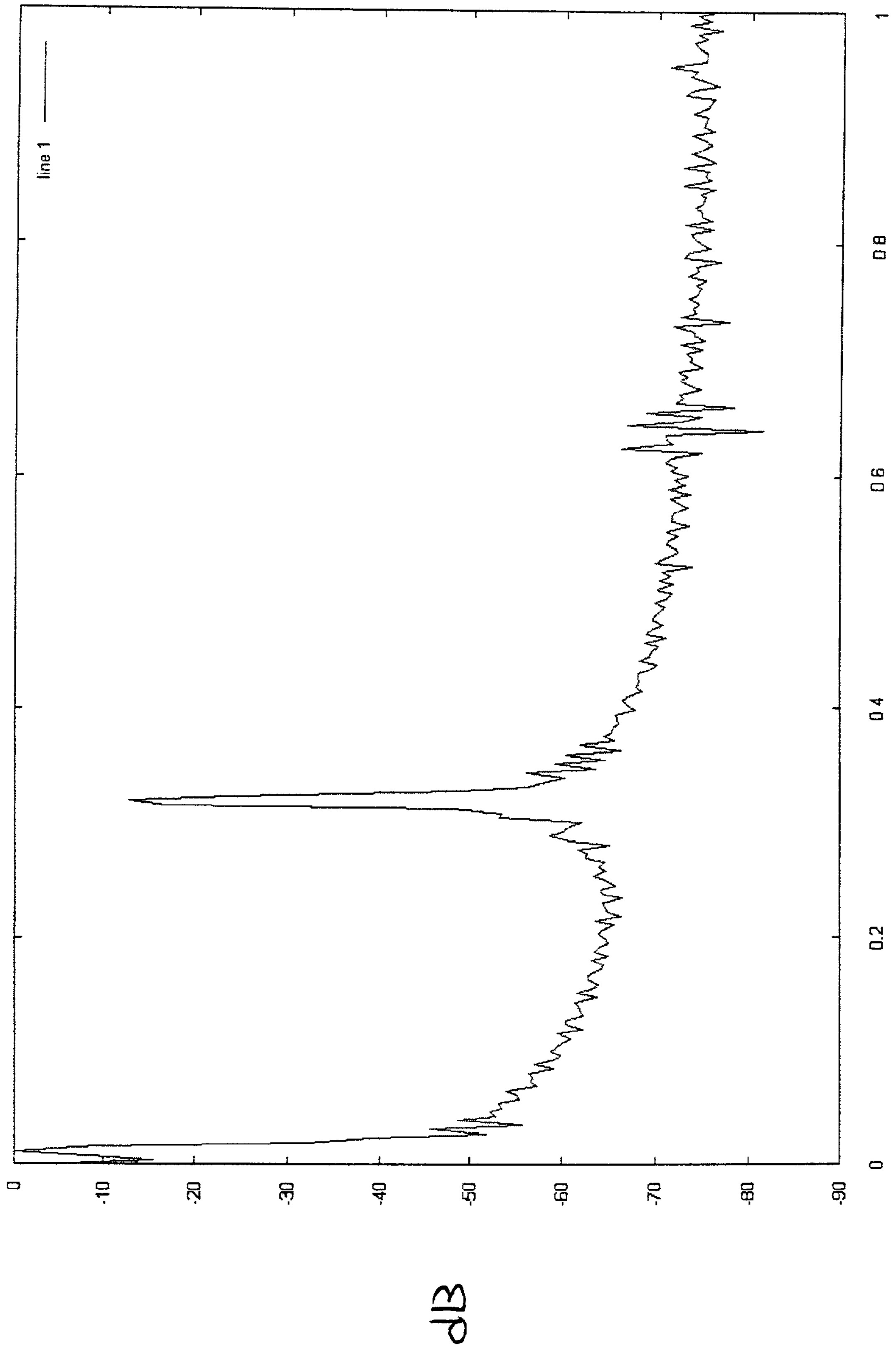
FIG. 36 is a frequency-domain plot of the signal of FIG. 32 illustrating significantly attenuated spurious components in the output signal reconstructed in accordance with various aspects of the invention.

FIG. 34 illustrates the essentially pure spectral content of the simulated (program listing 39–47) input signal. FIG. 35 illustrates compandor distortion of the received error signal, including harmonic distortion (the first harmonic of low-frequency tone is about −27 dBc) and intermodulation distortion (−45 dBc products around the high-frequency tone). FIG. 36 illustrates the substantially pure spectral content of the simulated signal at the output of system 200, and shows no evidence of any significant distortion introduced by simulated transmission system 200.

As mentioned above, the simulation code in the program listing provides only examples of signal transmission according to preferred aspects of the invention, and does not specify any mandatory arrangement of circuitry or functional modules in any particular signal transmission system. In addition, the simulation code is not represented as being without "bugs" or inaccuracies. The simulation and the examples it presents may be better understood with reference to the variable definitions immediately below and the comments interspersed within the program listing.

VARIABLE "b"—Vector of FIR coefficients.

VARIABLE "dq"—Vector of expectation error samples, each being the difference between an original signal sample and a corresponding estimated signal sample.

VARIABLE "N1"—Denominator of forgetting factor, N1−1/N1. Preferably, N1=512, though the GNU Octave simulation uses N1=128 for ease of illustration. Predictor coefficients should "gravitate" toward zero, so that communications glitches have limited lifespans. N1=512 represents a trade-off between performance under ideal conditions and performance in the "real world," with insignificant degradation of system performance appreciably under good conditions, but with recovery from glitches being still fast enough to result in good audio quality. The forgetting factor N1 also serves to limit the magnitude of the coefficients b. Without it, that magnitude would have to be limited some other way. Every time through the predictor loop, the coefficients are multiplied by (N1−1)/N1 and then a number not to exceed 1/N2 is added. Coefficients are bounded by −N1/N2<=x<=N1/N2.

VARIABLE "N2"—Constant that determines loop gain. When the coefficients b are updated, 1/N2 may be added or subtracted, depending on the signs of current and historical difference signals.

VARIABLE "total_zeros"—Total number of FIR coefficients available for use by predictor. Preferably 30 coefficients are used, though the GNU Octave simulation uses 16 for ease of illustration.

VARIABLE "active_zeros"—Number of FIR coefficients actively used by predictor. In variations, the influence of the last several coefficients can "fade out", i.e., carry less weight. This "fade out" can help to damp out some of the loop feedback that can cause audible buzzes, whines and other effects that prevent graceful degradation. In the presently preferred embodiment, all coefficients are active.

Figure 37:
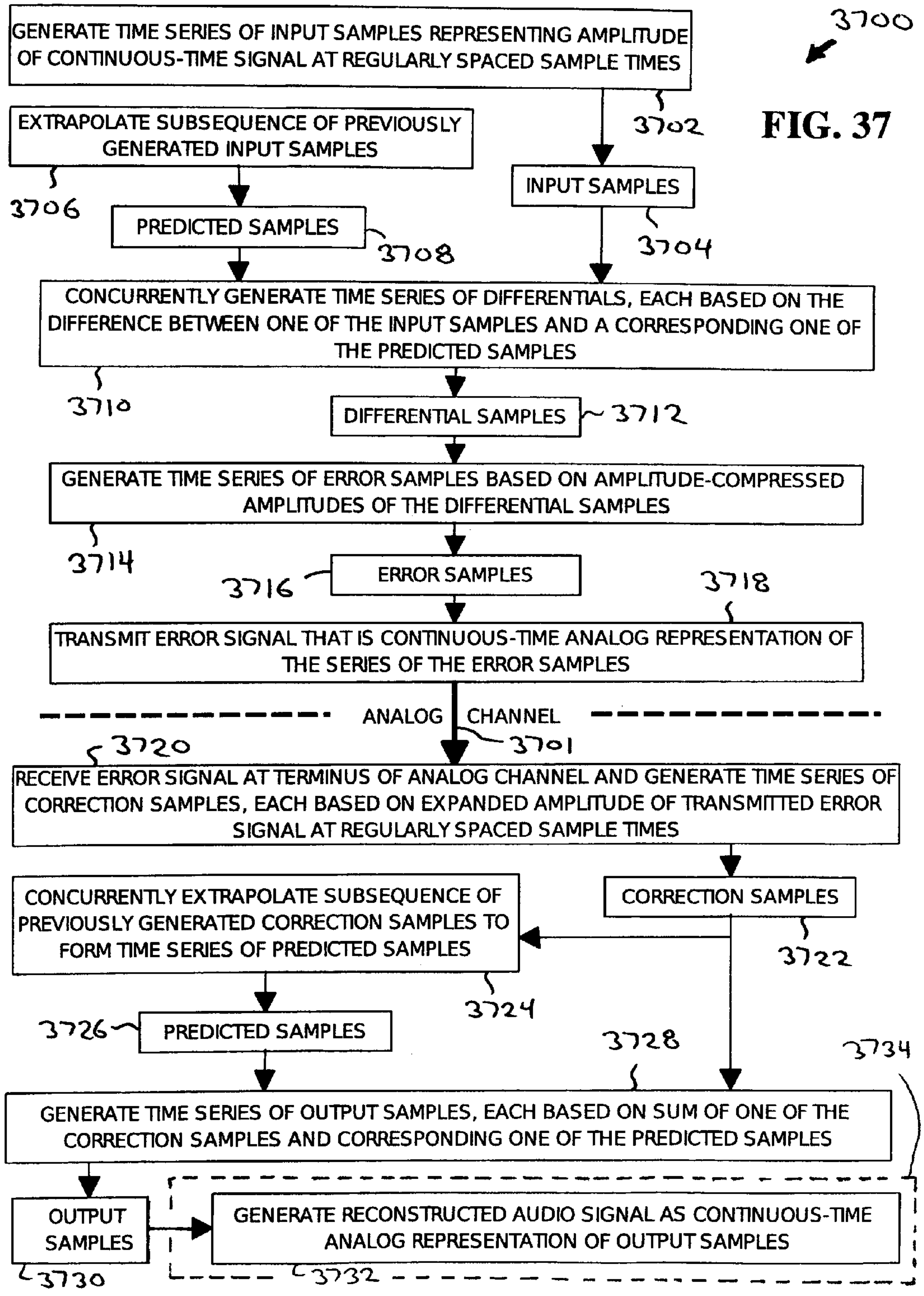
FIG. 37 is a flow diagram of a method of the invention for analog channel communication.

FIG. 37 is a flow diagram of a method 3700 of the invention for communication via an analog channel 3701. At 3702, a time series of input samples 3704 representing amplitude of a continuous-time signal at regularly spaced sample times is generated. At 3706, a subsequence of previously generated input samples is extrapolated to form a first time series of predicted samples 3708. As discussed in greater detail below with reference to FIG. 39, extrapolation of input samples to predicted samples can include computation of a differential between an input sample and a predicted sample, followed by amplitude compression, followed by amplitude expansion, followed by prediction error filtering.

At 3710, a time series of differentials 3712 is concurrently generated. Each differential is based on the difference between one of the input samples 3704 and a corresponding one of the first time series of predicted samples 3708. An act 3714 of method 3700 generates a time series of error samples 3716 based on amplitude-compressed amplitudes of differential samples 3712. At 3718, an error signal is transmitted via analog channel 3701. The error signal is a continuous-time analog representation of the series of error samples 3716.

At 3720, the error signal is received at a terminus of analog channel 3701. A time series of correction samples 3722 is generated at the terminus. Each correction sample is based on expanded amplitude of the transmitted error signal at regularly spaced sample times. Concurrently with the generation of correction samples at 3720, a subsequence of previously generated correction samples is extrapolated at 3724, forming a second time series of predicted samples 3726.

At 3728, a time series at output samples 3730 is generated. Each output sample is based on the sum of one of correction samples 3722 and one of predicted samples 3726. At 3732 (optionally as represented by dashed box 3734), a reconstructed audio signal can be generated as a continuous-time analog representation of output samples 3730.

Figure 38:
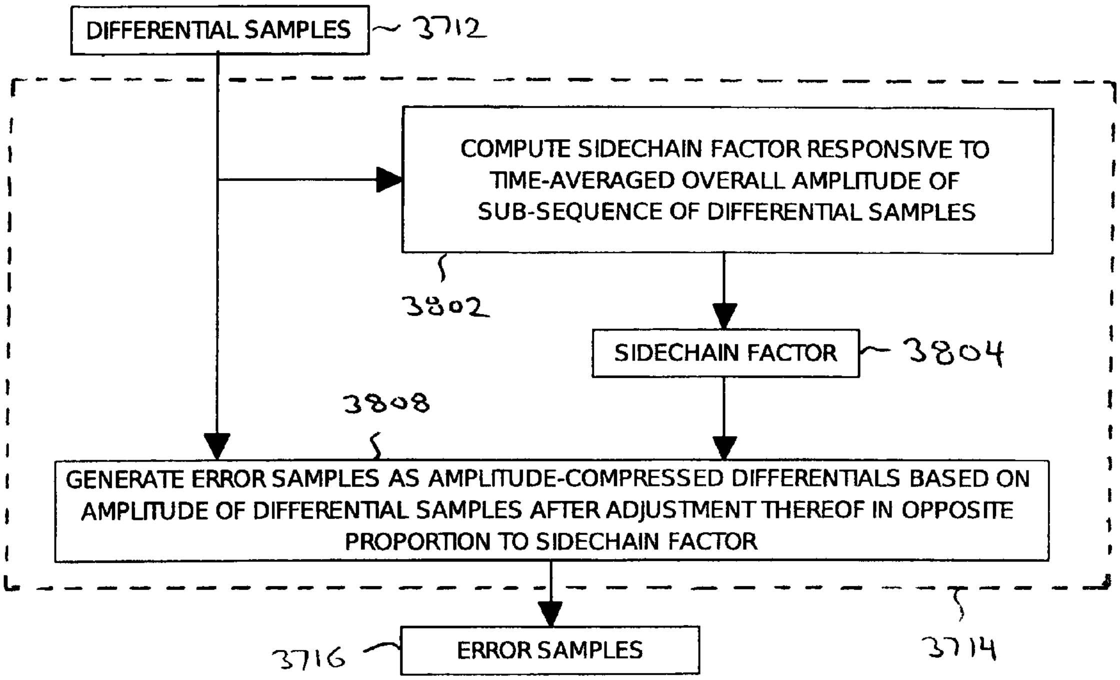
FIG. 38 is a flow diagram of an act that may be performed in the method of FIG. 37 in which a sidechain factor is employed during the generation of error samples.

FIG. 38 is a flow diagram of act 3714 of method 3700 (FIG. 37) in a way that it may optionally be performed with a sidechain factor during the generation of error samples. At 3802, a sidechain factor 3804 is computed that is responsive to a time-averaged overall amplitude of a sub-sequence of differential samples 3712. At 3808, error samples 3716 are generated as amplitude-compressed differentials based on amplitude of differential samples after adjustment thereof in opposite proportion to sidechain factor 3804.

Figure 39:
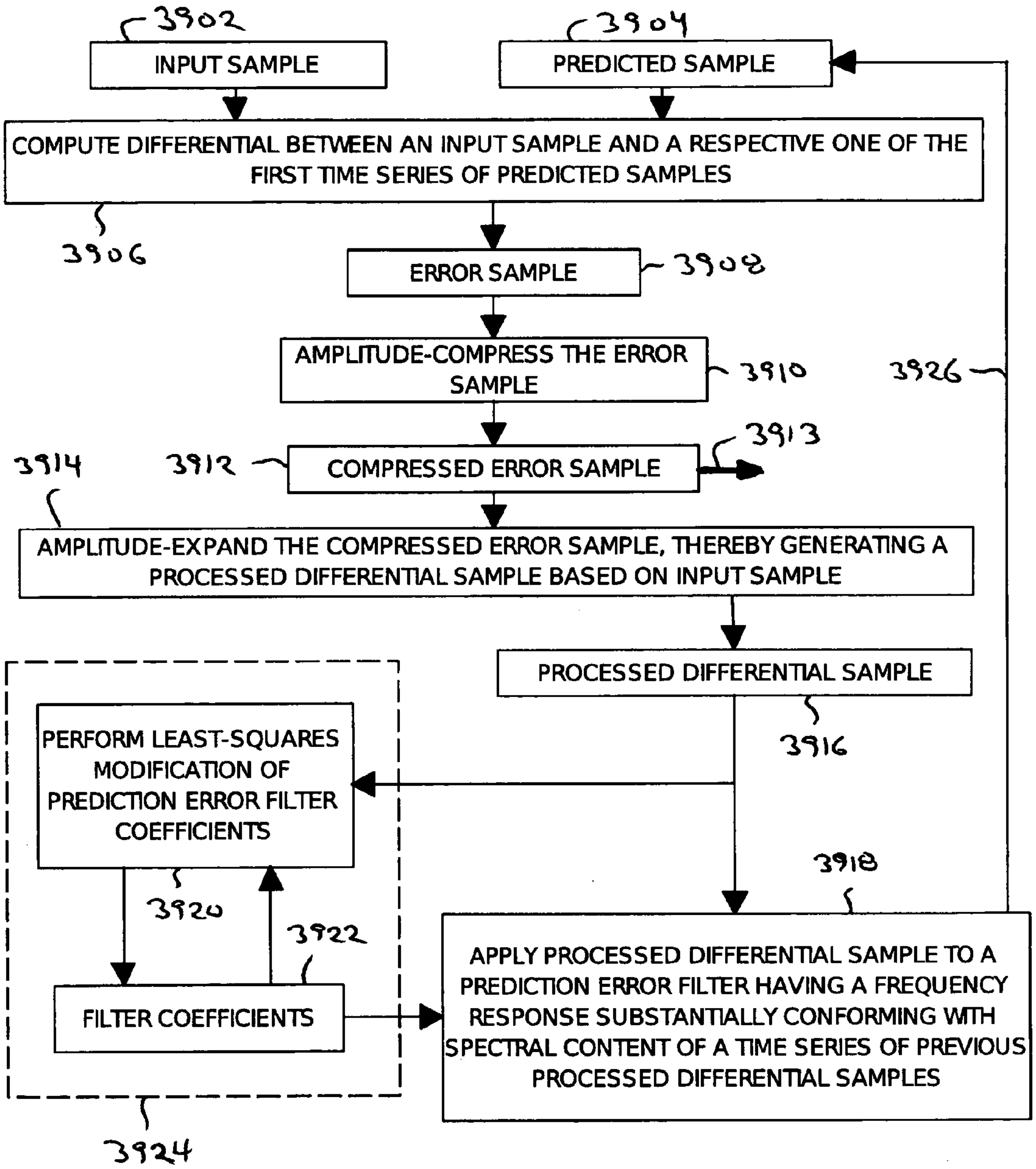
FIG. 39 is a flow diagram of an act that may be performed in the method of FIG. 37 in which a prediction error filter is employed during the generation of error samples.

FIG. 39 is a flow diagram of an act 3900 that may optionally be performed in method 3700, where a prediction error filter is employed during the generation of error samples. At 3906, differentials are computed between an input sample 3902 and a respective sample 3904 of the first time series of predicted samples 3708 (FIG. 37), thereby generating an error sample 3908. At 3910, error sample 3908 is amplitude-compressed, thereby generating a compressed error sample 3912. As indicated by line 3913, compressed error sample 3912 is an output of act 3900. At 3914, compressed error sample 3912 is amplitude-expanded, thereby generating a processed differential sample 3916 that is based on input sample 3902. At 3918, processed differential sample 3916 is applied to a prediction error filter having a frequency response substantially conforming with spectral content of a time series of previous processed differential samples. As indicated by line 3926, predicted sample 3904 is the output of the prediction error filter.

As a further option (so indicated by dashed box 3924), the prediction error filter can be periodically adapted to conform with the spectral content of the time series of processed differential samples. Such adapting can include providing a finite-impulse-response prediction error filter having a plurality of filter coefficients 3922. Then, at 3920, least-mean-squares modification of coefficients 3922 is performed. The modification is based on a previous set of filter coefficient values and the time series of processed differential samples.

Public Notice Regarding the Scope of the Invention and Claims

The inventor considers various elements of the aspects and methods recited in the claims filed with the application as advantageous, perhaps even critical to certain implementations of the invention. However, the inventor regards no particular element as being "essential," except as set forth expressly in any particular claim.

While the invention has been described in terms of preferred embodiments and generally associated methods, the inventor contemplates that alterations and permutations of the preferred embodiments and methods will become apparent to those skilled in the art upon a reading of the specification and a study of the drawings.

Additional structure can be included, or additional processes performed, while still practicing various aspects of the invention.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

In addition, aspects of the invention are particularly pointed out in the claims using terminology that the inventor regards as having its broadest reasonable interpretation; the more specific interpretations of 35 U.S.C. §112(6) are only intended in those instances where the terms "means" or "steps" are actually recited. The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. Both in the claims and in the description above, the conjunction "or" between alternative elements means "and/or," and thus does not imply that the elements are mutually exclusive unless context or a specific statement indicates otherwise.

COMPUTER PROGRAM LISTING

```
% FILE: SIM.M
% GNU Octave Simulation of "Signal-Predictive Audio Transmission System"
% Written by Edwin A. Suominen, Copyright (C) 2002 Lectrosonics, Inc.
%<<<<<<<<<< SETUP >>>>>>>>>>>%
clear
%%%%% Initialize Variables %%%%
N            = 2048;  % Simulation data set length
Nu           = N/16;  % Number of samples between plot updates
fixed_gain        = 1.0;
total_zeros       = 30;
active_zeros      = 30;        % Preferably, all zeros are active
N1           = 512;   % Constant for forgetting factor
N2           = 2048;  % Constant for loop gain
Nb           = 16;    % 16-bit DSP word is typical
m_log_c           = 0;         % Compressor sidechain, for diff_comp
                               (initially=0)
logratio          = 2;         % Log compression ratio (dB/dB)
logcenter         = 15;
logminmax = [-15 0];           % Compandor log range: lowest : highest
m_attack          = 44;        % Compandor attack time (samples)
m_release         = 220;       % Compandor release time (samples)
```

-continued

COMPUTER PROGRAM LISTING

```
minmaxlog = [0 15];                % Logamp log range: lowest : highest
full__scale = [-(2^Nb) 2^Nb-1];        % Clamp Range: -fs : +fs
half__scale = [-(2^(Nb-1)) 2^(Nb-1) -1]; % Clamp Range: -1/2 fs : +1/2 fs
global full__scale half__scale
%<<<<<<<<<< INITIALIZE COMPRESSION >>>>>>>>>>>%
plotminmax = [-(2^(Nb-1)) 2^(Nb-1)];
% Generate input data set: select an input signal and comment out the rest
b = zeros(1,total__zeros);                % Initialize coefficients
dq = zeros(1,total__zeros);               % Initialize expectation errors
m__square = 2^(2*minmaxlog(1));
%% Scenario 01
%% noise = -20;      % dB FS
%% input__samples = 2^(Nb-1) * [0.2*sineburst(N/2,20,1) . . .
0.1*sineburst(N/2,60,2)];
%% Scenario 02
%% noise = -17;      % dB FS
%% x = sweep(N,15,2);
%% input__samples = 2^(Nb-2) * ( (x>=0) - (x<0) );
%% Scenario 03
noise = 0;           % dS FS
fs = 44.1E3;         % Sample frequency
f1 = 250;            f2 = 7000;
n1 = f1*N/fs;        n2 = f2*N/fs;
p1 = 4;              p2 = 2;
A1 = -8;             A2 = -20;
input__samples = 2^Nb * . . .
( (10[](A1/20))*sineburst(N,n1-p1,p1) + (10[](A2/20))*sineburst(N,n2-
p2,p2) );
% Initialize compression plots
plotsetup( input__samples, plotminmax );
%<<<<<<<<<< COMPRESSION: BEGIN MAIN LOOP >>>>>>>>>>>%
for i=1:N
%%%% Extract Next Input Sample from Data Set %%%%
orig = input__samples(i);
%%%% Generate New Error Sample %%%%
% Generate a predicted sample using linear predictor
% Clamps (saturates) at half full scale
pred = fclamp( sum( b .* dq ), half__scale );
% Generate raw difference signal
% (Any large difference is clamped at full scale)
diff__raw = fclamp( orig-pred, full__scale );
% Compress difference signal for transmission over analog channel
diff__comp = . . .
 compandor__compress( fixed__gain*diff__raw, m__log__c, logratio, . . .
 logcenter, logminmax );
% Recover difference signal, accounting for saturation and quantization
diff__rec = . . .
 fclamp( ( compandor__expand( . . .
   diff__comp, m__log__c, logratio, logcenter, logminmax ) / fixed__gain ), . . .
   half__scale ) ;
% Update compressor sidechain
[m__log__c,m__square] = logamp__process(diff__comp, minmaxlog,
m__square, . . .
   m__attack, m__release);
% Update predictor coefficients
[b,dq] = adapt__update(total__zeros, active__zeros, N1, N2, diff__rec, b, dq);
%%%% Update Data Set & Plot of Results thus far Generated %%%%
mlogc__samples(i) = m__log__c;
predicted__samples(i) = pred;
error__samples(i) = diff__comp;
if ( rem(i,Nu) == 0 )
   k = i-Nu:i;
   if ( k(1) == 0 )
      k(1) = 1;
   endif
   subplot(3,1,2)
     plot (k,predicted__samples(k))
   subplot(3,1,3)
     plot(k,error__samples(k))
   array__b(:,i/Nu) = reshape(b,length(b),1);
   array__dq(:,i/Nu) = reshape(dq,length(b),1);
endif
%<<<<<<<<<< COMPRESSION: END MAIN LOOP >>>>>>>>>>>%
endfor
%<<<<<<<<<< COMPRESSION: RESULTS DISPLAY >>>>>>>>>>>%
disp('Hit any key to continue with sidechain plot . . .')
pause
```

-continued

COMPUTER PROGRAM LISTING

```
axis; subplot(1,1,1); plot(mlogc_samples)
gset ytics 1; gset grid; replot
disp(‘Hit any key to continue with mesh plots . . .’)
pause
mesh(array_b)
gset view 70,350,1,0.5; gset data style points; gset ytics 2; replot
disp(‘Hit any key for waterfall plot . . .’)
pause
for i = 1:columns(array_b)
   X(:,i) = 20*log10(abs(freqz(array_b(:,i))))’;
endfor
waterfall(X, ‘.’)
disp(‘Hit any key for next mesh plot’)
pause
mesh(array_dq)
gset view 80,340,1,0.5; gset data style points; gset ytics 2; replot
disp(‘Hit any key for waterfall plot . . .’)
pause
waterfall( array_dq / (2*full_scale(2)) )
disp(‘Hit any key to continue with expansion’)
pause
closeplot; clear array_*
%<<<<<<<<<< INITIALIZE EXPANSION >>>>>>>>>>>%
b = zeros(1,total_zeros);                % Initialize coefficients
dq = zeros(1,total_zeros);               % Initialize expectation errors
m_square = 2ˆ(2*minmaxlog(1));
% Simulate analog channel
if (noise != 0)
   noise = (10[](noise/20));
endif
noise_samples = full_scale(2)*noise*rand(size(error_samples));
received_samples = error_samples + noise_samples;
received_samples -= mean(received_samples);
% Initialize expansion plots
plotsetup( received_samples, plotminmax );
%<<<<<<<<<< EXPANSION: BEGIN MAIN LOOP >>>>>>>>>>>%
for i=1:N
%%%% Extract Next Received Sample from Data Set %%%%
rx = received_samples(i);
%%%% Reconstruct Signal from RX Sample %%%%
[log_e, m_square] = . . .
   logamp_process(rx, minmaxlog, m_square, m_attack, m_release );
diff_rec = fclamp( compandor_expand( rx/fixed_gain, log_e, logratio, . . .
   logcenter, logminmax ), half_scale );
% Generate a predicted difference sample using linear predictor
% (Any large difference is clamped at half scale)
pred_diff = fclamp( sum( b .* dq ), half_scale );
% Reconstruct original signal from sum of error signal and predicted signal
recon = fclamp( pred_diff + diff_rec, full_scale );
% Update predictor coefficients
[b,dq] = adapt_update(total_zeros, active_zeros, N1, N2, diff_rec, b, dq);
%%%% Update Data Set & Plot of Results thus far Generated %%%%
loge_samples(i) = log_e;
prediff_samples(i) = pred_diff;
recon_samples(i) = recon;
if ( rem(i,Nu) == 0 )
   k = i−Nu:i;
   if ( k(1) == 0 )
      k(1) = 1;
   endif
   subplot(3,1,2); plot(k,prediff_samples(k))
   subplot(3,1,3); plot(k,recon_samples(k))
   array_b(:,i/Nu) = reshape(b,length(b),1);
   array_dq(:,i/Nu) = reshape(dq,length(b),1);
endif
%<<<<<<<<<< EXPANSION: END MAIN LOOP >>>>>>>>>>>%
endfor
%<<<<<<<<<< EXPANSION: RESULTS DISPLAY >>>>>>>>>>>%
disp(‘Hit any key to continue with sidechain plot . . .’)
pause
axis; subplot(1,1,1); plot(loge_samples)
gset ytics 1; gset grid; replot
disp(‘Hit any key to continue with mesh plots . . .’)
pause
axis; subplot(1,1,1)
mesh(array_b)
gset view 70,350,1,0.5; gset data style points; gset ytics 2; replot
```

-continued

COMPUTER PROGRAM LISTING

```
disp('Hit any key for waterfall plot . . .')
pause
for i = 1:columns(array_b)
   X(:,i) = 20*log10(abs(freqz(array_b(:,i))))';
endfor
waterfall (X, '.')
disp('Hit any key for next mesh plot')
pause
mesh(array_dq)
gset view 80,340,1,0.5; gset data style points; gset ytics 2; replot
disp('Hit any key for waterfall plot . . .')
pause
waterfall( array_dq / full_scale(2) )
disp('Script complete. Type Octave commands for further analysis')
% FILE: ADAPT_UPDATE
function [b,dq] = . . .
   adapt_update (total_zeros, active_zeros, N1, N2, diff_rec, b, dq)
global full_scale
if (nargin <6)
   %% If b, dq not specified, just initialize them and return
   b = zeros(1,total_zeros);
   dq = zeros(l,total_zeros);
else
   x = (N1−1)/N1 .* b + (1/N2) .* sign(diff_rec) .* (2*(dq>0)−1);
   % Update active zeros with full-scale coefficient updates
   k = 1:active_zeros; b(k) = x(k);
   % Update any inactive zeros with reduced-weight coefficient updates
   if ( active_zeros < zeros )
      k = active_zeros+1:total_zeros;
        b(k) = x(k) ./ ( 2.[](k-ones(1,length(active_zeros))) );
   endif
   % Track historical different signal information, to update predictor
   % coefficients in the future.
   k = 2:total_zeros; dq(k) = dq(k−1); dq(1) = diff_rec;
endif
endfunction
% FILE: COMPANDOR_COMPRESS
function output = . . .
   compandor_compress ( input, sidechain, logratio, logcenter, logminmax )
global full_scale half_scale
sidechain = fclamp( sidechain-logcenter, logminmax );
output = fclamp( input/(2^(sidechain*(logratio−1))), half_scale );
endfunction
% FILE: COMPANDOR_EXPAND
function output = . . .
   compandor_expand ( input, sidechain, logratio, logcenter, logminmax )
global full_scale half_scale
sidechain = fclamp( sidechain-logcenter, logminmax );
output = fclamp( input*(2^(sidechain*(logratio−1))), half_scale );
endfunction
% FILE: FCLAMP
function y = fclamp (x, minmax)
     z = (x >= minmax(2)); y = (z==0) .* x + (z==1) .* ( minmax(2) );
     z = (y <= minmax(1)); y = (z==0) .* y + (z==1) .* ( minmax(1) );
endfunction
% FILE: LOGAMP_PROCESS
function [output, m_square] = . . .
logamp_process( sample, minmaxiog, m_square, m_attack, m_release )
a = fclamp( sample[]2, 2.[](2*minmaxlog) );
if ( a > m_square
   if ( m_square != 0 )
      m_square *= (1−1/m_attack);
   endif
   if ( a != 0 )
      m_square += a / m_attack;
   endif
else
   if ( m_square != 0 )
      m_square *= (1−1/m_release);
   endif
   if ( a != 0 )
      m_square += a / m_release;
   endif
endif
output = log2(sqrt(m_square));
endfunction
% FILE: PLOTSETUP
```

-continued

COMPUTER PROGRAM LISTING

```
function plotsetup (x,minmax)
closeplot; gnuplot_has_multiplot = 1
N = length(x); pk = 1.1 * [min(x) max(x)];
if (nargin==1)
   axis ( [0 N 1.1*pk(1) 1.1*pk(2)] )
else
   axis( [0 N minmax] )
endif
gset nokey
gset grid
gset axis
gset xtics 256
gset ytics 8192
subplot(3,1,1); plot(1:N,X); replot
endfunction
% FILE: SINEBURST
function y = sineburst (N, cycles, cycles_off)
cycles_on = cycles - cycles_off; Omega = 2*pi*cycles/N;
N1 = (cycles_off/2) / (Omega/(2*pi)); N2 = N - N1;
x = zeros(1,N); k = N1:N2;
x(k) = sin(Omega*k); y = x;
endfunction
% FILE: SWEEP
function y = sweep (N, cycles, cycles_off)
Omega = 2*pi*cycles/N;
N1 = (cycles_off/2) / (Omega/(2*pi)); N2 = N - N1;
x = zeros(1,N); k = N1:N2;
x(k) = sin(linspace(0,Omega,length(k)) .* k); y = x;
endfunction
% FILE: WATERFALL
function waterfall(X,style)
if (nargin == 1)
   style = 'o';
endif
N = size(X) (2);
locminmax = max(X) - min(X);
c = 2/N * floor( N*max(locminmax) );
x = 0; y = 0;
for i=0:N-1
   x = [x c*i+1:c*i+size(X) (1)];
   y = [y X(:,i+1)'+c*i];
endfor
plot(x,y,style); gset nokey
eval(strcat('gset ytics ',num2str(c)));
gset grid
replot
endfunction
```

What is claimed is:

1. A method for transmitting and receiving a signal via an analog channel, comprising the acts of:

(a) generating a time series of input samples representing amplitude of a continuous-time signal at regularly spaced sample times;

(b) extrapolating a subsequence of previously generated input samples to form a first time series of predicted samples;

(c) concurrently generating a time series of differentials, each differential based on the difference between one of the input samples and a corresponding one of the first time series of predicted samples;

(d) generating a time series of error samples based on amplitude-compressed amplitudes of the differential samples;

(e) transmitting via the analog channel an error signal that is a continuous-time analog representation of the series of error samples;

(f) receiving the error signal at a terminus of the analog channel;

(g) generating at the terminus a time series of correction samples, each correction sample based on expanded amplitude of the transmitted error signal at regularly spaced sample times;

(h) concurrently with act (g), extrapolating a subsequence of previously generated correction samples to form a second time series of predicted samples; and (i) generating a time series of output samples, each based on the sum of one of the correction samples and the corresponding one of the second time series of predicted samples.

2. The method of claim 1 wherein generating the time series of error samples comprises:

(a) computing a sidechain factor responsive to a time-averaged overall amplitude of a sub-sequence of differential samples; and (b) generating the error samples as amplitude-compressed differentials based on amplitude of the differential samples after adjustment thereof in opposite proportion to the sidechain factor;

(c) wherein a first difference in overall amplitude, between sub-sequences of large error samples and sub-sequences of small error samples, is substantially smaller than a second difference in overall amplitude, between sub-sequences of large differentials and sub-sequences of small differentials.

3. The method of claim 2 wherein the first difference is about half the second difference on a logarithmic scale.

4. The method of claim 1 further comprising generating a reconstructed audio signal as a continuous-lime analog representation of the time series of output samples.

5. The method of claim 1 wherein generating the time series of error samples comprises, for each error sample in the sequence:

(a) computing a differential between an input sample and a respective one of the first time series of predicted samples and generating an error sample thereby;

(b) amplitude-compressing the error sample and generating a compressed error sample thereby;

(c) amplitude-expanding the compressed error sample, thereby generating a processed differential sample that is based on the input sample; and (d) applying the processed differential sample to a prediction error filter having a frequency response substantially conforming with spectral content of a time series of previous processed differential samples.

6. The method of claim 5 further comprising periodically adapting the prediction error filter to conform with the spectral content of the time series of previous processed differential samples.

7. The method of claim 6 wherein adapting comprises:

(a) providing a finite-impulse-response prediction error filter having a plurality of filter coefficients; and (b) performing least-mean-squares modification of the coefficients based on (1) a previous set of filter coefficient values, and (2) the time series of previous processed differential samples.

8. A signal-predictive audio transmission system comprising:

(a) a transmitter including:

(1) a sample predictor responsive to input samples of a continuous-time signal;

(2) a differential computer responsive to the input samples and predicted samples from the sample predictor that are each based on extrapolation of a sub-sequence of the input samples;

(3) an amplitude compressor responsive to differential samples from the differential computer, wherein each differential sample is based on the difference between one of the input samples and a corresponding one of the predicted samples; and (4) circuitry responsive to a time series of amplitude-compressed error samples from the amplitude compressor and producing therefrom a continuous-time error signal; and (b) a receiver coupled to the transmitter via an analog channel and responsive to the continuous-time error signal via the analog channel.

9. The system of claim 8 further comprising a sidechain generator coupled to the differential computer and the amplitude compressor and responsive to a time-averaged overall amplitude of a sub-sequence of the differential samples, wherein:

(a) the amplitude compressor is responsive to a sidechain factor from the sidechain generator, thereby generating the error samples as amplitude-compressed differentials based on amplitude of the differential samples after adjustment thereof in opposite proportion to the sidechain factor; and (b) a difference in overall amplitude of error samples from the amplitude compressor between sub-sequences of large error samples and sub-sequences of small error samples is substantially smaller than a difference in overall amplitude between sub-sequences of large differentials and sub-sequences of small differentials.

10. The system of claim 9 wherein the first difference is about half the second difference on a logarithmic scale.

11. The system of claim 9 wherein the amplitude compressor is a feedback-type amplitude compressor.

12. The system of claim 11 further comprising a feedforward-type amplitude expander coupled to the sample predictor and responsive to the time series of amplitude-compressed error samples from the amplitude compressor, thereby generating processed differential samples, wherein the sample predictor is responsive to the input samples as reflected by the processed differential samples conveyed by the amplitude compressor followed by the amplitude expander.

13. The system of claim 12 wherein the sample predictor includes a prediction error filter having a frequency response substantially conforming with spectral content of a time series of the processed differential samples.

14. The system of claim 13 wherein the prediction error filter is an adaptive finite-impulse-response filter.

15. The system of claim 8 wherein the receiver includes:

(a) circuitry responsive to the continuous-time error signal and producing error samples therefrom;

(b) an amplitude expander responsive to the error samples and producing correction samples therefrom;

(c) a second sample predictor responsive to the correction samples; and (d) a summing junction responsive to the correction samples and predicted samples from the second sample predictor that are each based on extrapolation of a sub-sequence of the correction samples.

16. The system of claim 15 wherein the receiver further includes circuitry coupled to the summing junction and conveying a reconstructed audio signal.

17. The system of claim 15 wherein the amplitude compressor of the transmitter is a feedback-type amplitude compressor and the amplitude expanders of the transmitter and receiver are feedforward-type expanders.

18. A method for transmitting a signal via an analog channel, comprising the acts of:

(a) generating a time series of input samples representing amplitude of a continuous-time signal at regularly spaced sample times;

(b) extrapolating a subsequence of previously generated input samples to form a first time series of predicted samples;

(c) concurrently generating a time series of differentials, each differential based on the difference between one of the input samples and a corresponding one of the first time series of predicted samples;

(d) generating a time series of error samples based on amplitude-compressed amplitudes of the differential samples; and (e) transmitting via an analog channel an error signal that is a continuous-time analog representation of the series of error samples.

19. The method of claim 18 wherein generating the time series of error samples comprises, for each error sample in the sequence:

(a) computing a differential between an input sample and a respective one of the first time series of predicted samples and generating an error sample thereby;

(b) amplitude-compressing the error sample and generating a compressed error sample thereby;

(c) amplitude-expanding the compressed error sample, thereby generating a processed differential sample that is based on the input sample; and (d) applying the processed differential sample to a prediction error filter having a frequency response substantially conforming with spectral content of a time series of previous processed differential samples.

20. The method of claim 19 further comprising periodically adapting the prediction error filter to conform with the spectral content of the time series of processed differential samples.

* * * * *

UNITED STATES PATENT AND TRADEMARK OFFICE

CERTIFICATE OF CORRECTION

PATENT NO. : 7,225,135 B2
APPLICATION NO. : 10/118115
DATED : May 29, 2007
INVENTOR(S) : David B. Thomas It is certified that error appears in the above-identified patent and that said Letters Patent is hereby corrected as shown below:

Column 27, Line 8 Change “continuous-lime” to -- continuous-time --.

Signed and Sealed this

Twenty-third Day of October, 2007

JON W. DUDAS

*Director of the United States Patent and Trademark Office*